United States Patent
Yamazaki et al.

(10) Patent No.: US 10,992,886 B2
(45) Date of Patent: Apr. 27, 2021

(54) SOLID STATE IMAGING DEVICE, IMAGING SYSTEM, AND DRIVE METHOD OF SOLID STATE IMAGING DEVICE

(71) Applicant: CANON KABUSHIKI KAISHA, Tokyo (JP)

(72) Inventors: Kazuo Yamazaki, Yokohama (JP); Shinichiro Shimizu, Kawasaki (JP); Yasuhiro Oguro, Tokyo (JP); Yu Arishima, Yokohama (JP); Hideaki Takada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 77 days.

(21) Appl. No.: 16/559,148

(22) Filed: Sep. 3, 2019

(65) Prior Publication Data
US 2020/0084397 A1 Mar. 12, 2020

(30) Foreign Application Priority Data

Sep. 10, 2018 (JP) .............................. JP2018-168745

(51) Int. Cl.
*H04N 5/347* (2011.01)
*H04N 5/378* (2011.01)
*H04N 5/369* (2011.01)

(52) U.S. Cl.
CPC ........... *H04N 5/347* (2013.01); *H04N 5/3692* (2013.01); *H04N 5/378* (2013.01)

(58) Field of Classification Search
CPC ...... H04N 5/347; H04N 5/3692; H04N 5/378; H04N 5/376
See application file for complete search history.

(56) References Cited

U.S. PATENT DOCUMENTS

| 6,188,094 B1 * | 2/2001 | Kochi | ............... H01L 27/14609 257/232 |
| 7,187,052 B2 | 3/2007 | Okita | |
| 7,283,305 B2 | 10/2007 | Okita | |

(Continued)

FOREIGN PATENT DOCUMENTS

| JP | 2005-277709 | 10/2005 |
| JP | 2008-67107 | 3/2008 |

OTHER PUBLICATIONS

U.S. Appl. No. 16/443,119, filed Jun. 17, 2019 by Daisuke Kobayashi et al.

(Continued)

*Primary Examiner* — Seung C Sohn
(74) *Attorney, Agent, or Firm* — Venable LLP

(57) ABSTRACT

Disclosed embodiments perform readout at a high rate without being affected by transition of pixel transistors. A solid state imaging device of an embodiment has a pixel having a photoelectric conversion unit that generates charges, an amplification transistor including an input node that receives a signal based on the charges generated in the photoelectric conversion unit, and a reset transistor that resets the potential of the input node of the amplification transistor; a signal processing circuit that reads out a signal from the pixel via a signal line; and a switch provided between the signal line and an input node of the signal processing circuit, and a signal value of a control signal applied to the gate of the reset transistor changes while the switch is in the off-state.

13 Claims, 9 Drawing Sheets

(56) References Cited

U.S. PATENT DOCUMENTS

| | | |
|---|---|---|
| 7,423,790 B2 | 9/2008 | Kochi |
| 7,531,885 B2 | 5/2009 | Okita |
| 7,538,804 B2 | 5/2009 | Okita |
| 7,557,847 B2 | 7/2009 | Okita |
| 7,629,568 B2 | 12/2009 | Koizumi |
| 7,646,493 B2 | 1/2010 | Okita |
| 7,755,688 B2 | 7/2010 | Hatano |
| 7,816,755 B2 | 10/2010 | Yamazaki |
| 7,889,254 B2 | 2/2011 | Koichi |
| 7,906,755 B2 | 3/2011 | Koizumi |
| 7,948,540 B2 | 5/2011 | Ogura |
| 7,948,541 B2 | 5/2011 | Koizumi |
| 7,961,237 B2 | 6/2011 | Hatano |
| 8,049,799 B2 | 11/2011 | Sonoda |
| 8,053,718 B2 | 11/2011 | Koizumi |
| 8,106,343 B2 | 1/2012 | Arishima |
| 8,120,686 B2 | 2/2012 | Hatano |
| 8,325,260 B2 | 12/2012 | Yamazaki |
| 8,466,401 B2 | 6/2013 | Arishima |
| 8,493,487 B2 | 7/2013 | Takada |
| 8,507,870 B2 | 8/2013 | Arishima |
| 8,519,316 B2 | 8/2013 | Kawabata |
| 8,520,108 B2 | 8/2013 | Ogura |
| 8,530,989 B2 | 9/2013 | Kikuchi |
| 8,553,115 B2 | 10/2013 | Arishima |
| 8,643,765 B2 | 2/2014 | Takada |
| 8,687,246 B2 | 4/2014 | Fujimura |
| 8,710,610 B2 | 4/2014 | Kono |
| 8,742,359 B2 | 6/2014 | Arishima |
| 8,760,337 B2 | 6/2014 | Yamazaki |
| 8,796,609 B2 | 8/2014 | Arishima |
| 8,797,435 B2 | 8/2014 | Koizumi |
| 8,810,706 B2 | 8/2014 | Yamazaki |
| 8,836,313 B2 | 9/2014 | Takagi |
| 8,836,833 B2 | 9/2014 | Yamashita |
| 9,040,895 B2 | 5/2015 | Kawabata |
| 9,060,139 B2 | 6/2015 | Yamazaki |
| 9,153,610 B2 | 10/2015 | Kobayashi |
| 9,232,164 B2 | 1/2016 | Minowa |
| 9,276,036 B2 | 3/2016 | Arishima |
| 9,288,415 B2 | 3/2016 | Yamazaki |
| 9,407,847 B2 | 8/2016 | Maehashi |
| 9,438,841 B2 | 9/2016 | Yamazaki |
| 9,445,026 B2 | 9/2016 | Kobayashi |
| 9,445,029 B2 | 9/2016 | Shimizu |
| 9,509,931 B2 | 11/2016 | Kobayashi |
| 9,549,139 B2 | 1/2017 | Ikeda |
| 9,554,069 B2 | 1/2017 | Shimizu |
| 9,667,901 B2 | 5/2017 | Sakai |
| 9,681,076 B2 | 6/2017 | Oguro |
| 9,762,840 B2 | 9/2017 | Yamazaki |
| 9,900,536 B2 * | 2/2018 | Morita ................ H04N 5/3696 |
| 10,403,658 B2 | 9/2019 | Takada |
| 2005/0174552 A1 | 8/2005 | Takada |
| 2008/0062296 A1 | 3/2008 | Ogura |
| 2009/0201406 A1 | 8/2009 | Okita |
| 2011/0198482 A1 | 8/2011 | Ogura |
| 2012/0008030 A1 | 1/2012 | Kono |
| 2012/0013778 A1 | 1/2012 | Sonoda |
| 2012/0105670 A1 | 5/2012 | Arishima |
| 2013/0113966 A1 | 5/2013 | Arishima |
| 2014/0117211 A1 | 5/2014 | Arishima |
| 2015/0077605 A1 | 3/2015 | Takada |
| 2015/0181144 A1 | 6/2015 | Sugiyama |
| 2015/0281610 A1 | 10/2015 | Ota |
| 2018/0316881 A1 | 11/2018 | Arishima |

OTHER PUBLICATIONS

U.S. Appl. No. 16/701,029, filed Dec. 2, 2019 by Hideaki Takada et al.

* cited by examiner

SOLID STATE IMAGING DEVICE, IMAGING SYSTEM, AND DRIVE METHOD OF SOLID STATE IMAGING DEVICE

BACKGROUND OF THE INVENTION

Field of the Invention

The present invention relates to a solid state imaging device, an imaging system, and a drive method of the solid state imaging device.

Description of the Related Art

As a solid state imaging device, for example, a Complementary Metal Oxide Semiconductor (CMOS) type solid state imaging device is used. A CMOS type solid state imaging device disclosed in Japanese Patent Application Laid-Open No. 2008-67107 has a plurality of two-dimensionally arranged pixels and an amplifier configured to read out signals from the pixels on each column via a signal line. Each of the pixels has a photodiode that accumulates charges in accordance with an incident light and a transfer transistor that transfers the charges to the input node of an amplification transistor. In Japanese Patent Application Laid-Open No. 2008-67107, an isolation switch is provided between the signal line and the amplifier, and the isolation switch is controlled to an off-state during transition of a transfer pulse used for controlling the transfer transistor.

In the solid state imaging device disclosed in Japanese Patent Application Laid-Open No. 2008-67107, however, influence of transition of the pixel transistor other than the transfer transistor is not considered, and it is thus difficult to perform readout at a high rate.

SUMMARY OF THE INVENTION

According to one disclosure of the present invention, provided is a solid state imaging device including a pixel having a photoelectric conversion unit that generates charges, an amplification transistor including an input node that receives a signal based on the charges generated in the photoelectric conversion unit, and a reset transistor that resets a potential of the input node of the amplification transistor; a signal processing circuit that reads out a signal from the pixel via a signal line; and a switch provided between the signal line and an input node of the signal processing circuit, a signal value of a control signal applied to the gate of the reset transistor changes while the switch is in an off-state, the switch is in the off-state in a period including at least a part of a period in which the reset transistor is in an on-state, and the signal value of the control signal applied to the gate of the reset transistor changes while the signal processing unit is in an inactive state and the switch is in the off-state.

According to another disclosure of the present invention, provided is a drive method of the solid state imaging device including a pixel having a photoelectric conversion unit generates charges, an amplification transistor including the input node that receives a signal based on the charges generated in the photoelectric conversion unit, and a reset transistor that resets a potential of the input node of the transistor, a signal processing circuit that reads out a signal from the pixel via the signal line, and a switch provided between the signal line and the input node of the signal processing circuit, and the drive method includes steps of: controlling the reset transistor from an off-state to an on-state after controlling the switch from an on-state to an off-state; controlling the switch from an off-state to an on-state after controlling the reset transistor from an on-state to an off-state; sampling and holding a signal of the input node by the signal processing circuit with the switch being in the on-state; and changing a signal value of a control signal applied to a gate of the reset transistor while the signal processing circuit is in an inactive state and the switch is in the off-state.

Further features of the present invention will become apparent from the following description of exemplary embodiments with reference to the attached drawings.

DESCRIPTION OF THE EMBODIMENTS

The embodiments of the present invention will be described in detail below by using drawings.

First Embodiment

Figure 1:
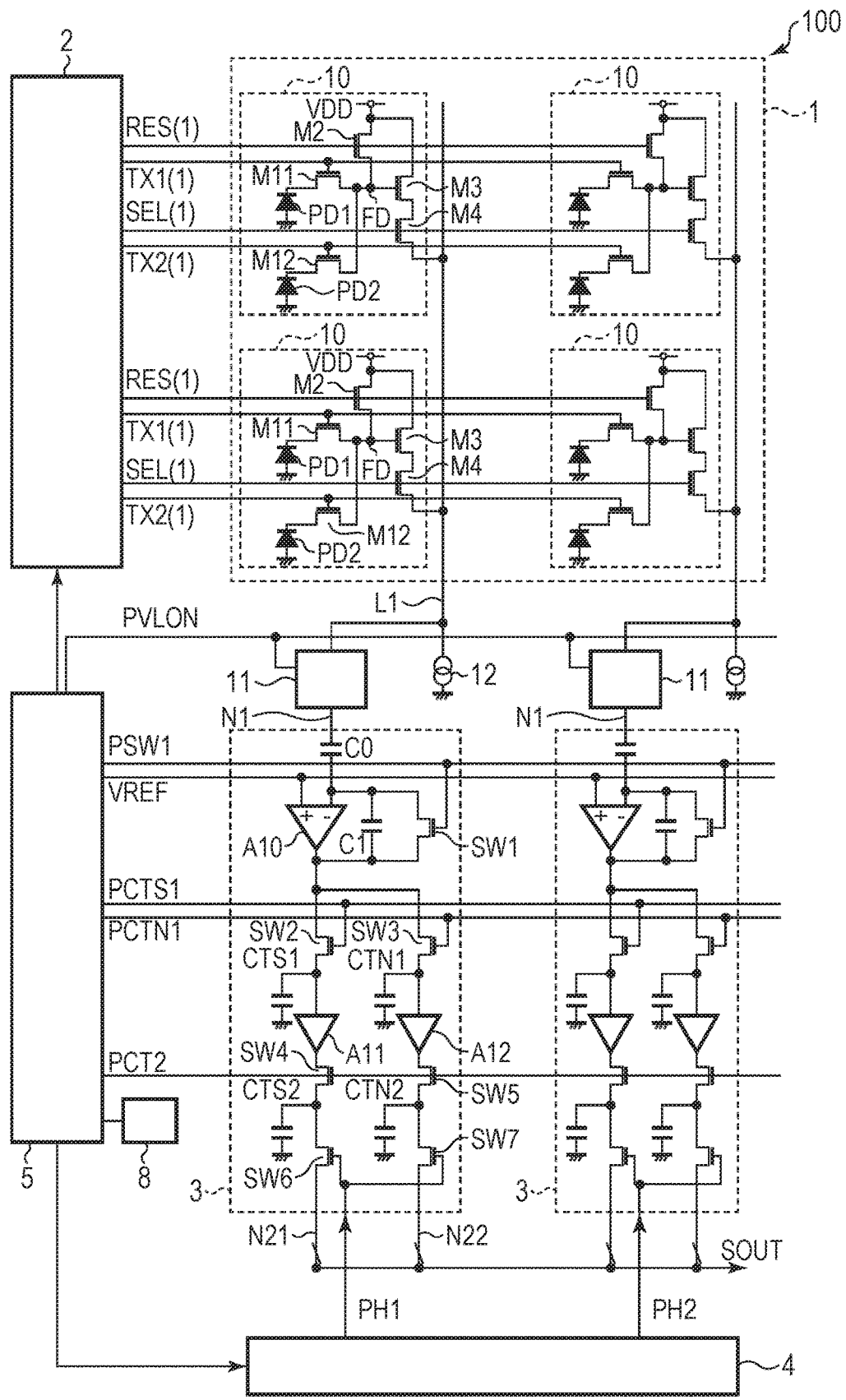
FIG. 1 is a block diagram of a solid state imaging device in a first embodiment of the present invention.

A solid state imaging device and a drive method thereof in the present embodiment will be described by using FIG. 1 and FIG. 2. In respective drawings, the same or corresponding features or signals are labeled with the same reference, and the description thereof may be omitted.

First, the general configuration of the solid state imaging device (signal processing device) of the present embodiment will be described by using FIG. 1. FIG. 1 is a block diagram of the solid state imaging device. A solid state imaging device 100 is a CMOS image sensor, for example, and has a pixel array 1, a vertical scanning circuit 2, signal processing circuits 3, a horizontal scanning circuit 4, a timing generator 5, isolation switches 11, and constant current sources 12.

The pixel array 1 has a plurality of pixels 10 arranged in a matrix. While the pixel array 1 of four rows by two columns is illustrated in FIG. 1 for simplified illustration, the number of pixels 10 arranged in the row direction and the column direction is not particularly limited. Note that the row direction represents the horizontal direction in the drawings and the column direction represents the vertical direction in the drawings in the present specification. Microlenses and color filters may be arranged on the pixels 10. The color filters may be filters of a primary color including red, blue, and green, for example, and provided on respective pixels 10 in accordance with the Bayer arrangement. Some of the pixels 10 are light-shielded as an optical black pixel (OB pixel). A ranging row on which focus detecting pixels that output pixel signals used for focus detection are arranged and a plurality of imaging rows on which imaging pixels that output pixel signals used for generating an image are arranged may be provided on a plurality of pixels 10. A column signal line L1 is provided on each column of the pixels 10, and the constant current source 12 is electrically connected to the column signal line L1.

The pixel 10 includes photoelectric conversion units PD1 and PD2, a floating diffusion region FD, transfer transistors M11 and M12, a reset transistor M2, an amplification transistor M3, and a select transistor M4. The pixel 10 has a pair of photoelectric conversion units PD1 and PD2 and corresponds to one unit pixel including two pixels. An example in which each transistor forming the pixel 10 is an N-channel MOS transistor will be illustrated in the description below. The photoelectric conversion units PD1 and PD2 are formed of a photodiode, for example, and perform electric conversion with an incident light and generation and accumulation of charges. The anode of the photoelectric conversion unit PD1 is connected to the ground voltage line, and the cathode is connected to the source of the transfer transistor M11. The anode of the photoelectric conversion unit PD2 is connected to the ground voltage line, and the cathode is connected to the source of the transfer transistor M12. Note that the photoelectric conversion units PD1 and PD2 are not limited to a photodiode and may be any material that produces a photoelectric effect. Further, dark current noise can be reduced by forming an embedded type photodiode.

In the present embodiment, the photoelectric conversion units PD1 and PD2 are allocated on two different rows. Note that the number of photoelectric conversion units forming the pixel 10 is not limited to two and may be more than two. The photoelectric conversion units PD1 and PD2 share a readout circuit including the reset transistor M2, the amplification transistor M3, and the select transistor M4. Note that the pixel 10 may not include the select transistor M4. Further, a capacitor used for holding charges and a switch used for connecting the adjacent two floating diffusion portions FD to each other may be provided. Note that, in the following description, the transistors forming the pixel 10 such as transfer transistors M11 and M12, the reset transistor M2, the amplification transistor M3, the select transistor M4, or the like may be collectively referred to as a pixel transistor.

The transfer transistors M11 and M12 are provided to the photoelectric conversion units PD1 and PD2, respectively. The drains of the transfer transistors M11 and M12 are connected to the source of the reset transistor M2 and the gate of the amplification transistor M3. A connection node (input node) of the drains of the transfer transistors M11 and M12, the source of the reset transistor M2, and the gate of the amplification transistor M3 forms the floating diffusion region FD. The drains of the reset transistor M2 and the amplification transistor M3 are connected to a power supply voltage line VDD. The source of the amplification transistor M3 is connected to the drain of the select transistor M4. Control signals TX1 and TX2 are supplied to the gates of the transfer transistors M11 and M12 from the vertical scanning circuit 2. In response to the control signals TX1 and TX2 being controlled to a high level, the transfer transistors M11 and M12 are turned on (conduction state), and charges accumulated in the photoelectric conversion units PD1 and PD2 are transferred to the floating diffusion region FD formed at the gate of the amplification transistor M3. Further, in response to the control signals TX1 and TX2 being controlled to a low level, the transfer transistors M11 and M12 are turned off (non-conduction state). Charges in the photoelectric conversion units PD1 and PD2 can be transferred to the floating diffusion region FD by turning on or off the transfer transistors M11 and M12. The floating diffusion region FD converts charges into a voltage, and the amplification transistor M3 outputs a voltage in accordance with the gate voltage from the source to the column signal line L1 via the select transistor M4.

The source of the reset transistor M2 is connected to the floating diffusion region FD, and a control signal RES is applied to the gate from the vertical scanning circuit 2. In response to the control signal RES being controlled to the high level, the reset transistor M2 is turned on, and the power supply voltage is supplied to the floating diffusion region FD. The select transistor M4 is provided between the amplification transistor M3 and the column signal line L1, and a control signal SEL is applied to the gate of the select transistor M4 from the vertical scanning circuit 2. In response to the control signal SEL being controlled to the high level, the amplification transistor M3 is electrically connected to the column signal line L1. Further, in response to the control signal SEL being controlled to the low level, the amplification transistor M3 is electrically disconnected from the column signal line L1.

The vertical scanning circuit (control circuit) 2 is formed of a shift register, a gate circuit, a buffer circuit, or the like and outputs control signals based on a vertical synchronization signal, a horizontal synchronization signal, a clock signal, or the like. The control signals are supplied to respective gates of the transfer transistors M11 and M12, the reset transistor M2, and the select transistor M4 on each row. A drive signal may be supplied on a row basis, sequentially, or at random. A signal line TX1, a signal line TX2, a signal line RES, and a signal line SEL are arranged on each row of the pixel array 1 extending in the row direction. The signal line TX1 is connected to the gates of the transfer transistors M11 of the pixels 10 aligned in the row direction, respectively, and the signal line TX2 is connected to the gates of the transfer transistors M12 of the pixels 10 aligned in the row direction, respectively. The signal line RES is connected to the gates of the reset transistors M2 of the pixels 10 aligned in the row direction, respectively, and the signal line SEL is connected to the gates of the select transistors M4 of the pixels 10 aligned in the row direction, respectively. Each of the signal lines TX1, TX2, RES, and SEL is a common signal line (one signal line) for each of the plurality of pixels 10 aligned in the row direction. In FIG. 1, the number corresponding to a row number is attached to the signal lines. For example, respective signal lines on the first row are represented as RES(1), SEL(1), TX1(1), and TX2(1), and respective signal lines on the second row are represented as RES(2), SEL(2), TX1(2), and TX2(2).

The column signal lines L1 are arranged on respective columns of the pixel array 1 extending in the column direction. The column signal line L1 is a signal line connected to the source of respective select transistors M4 of the plurality of pixels 10 aligned in the column direction and provided so as to be common to the plurality of pixels 10. The column signal line L1 is connected to an input node N1 of the signal processing circuit 3 via the isolation switch 11. Further, the column signal line L1 is connected to the constant current source 12. The constant current source 12 forms a source follower circuit together with the amplification transistor M3. The constant current source 12 may be a current source whose current value can be switched.

The isolation switch 11 includes a transistor switch or the like and can control the electrical connection between the column signal line L1 and the input node N1 of the signal processing circuit 3. A control signal PVLON is input to the isolation switch 11. In response to the control signal PVLON being controlled to the high level, the isolation switch 11 electrically connects the column signal line L1 and the input node N1 to each other, and in response to the control signal PVLON being controlled to the low level, the isolation switch 11 electrically isolates the column signal line L1 and the input node N1 from each other.

The signal processing circuit 3 is provided on each column of the pixels 10 and reads out pixel signals from the pixels 10 transferred to the column signal line L1. The signal processing circuit 3 includes an operational amplifier circuit A10, buffer circuits A11 and A12, switches SW1 to SW7, an input capacitor C0, a feedback capacitor C1, and holding capacitors CTS1, CTN1, CTS2, and CTN2. In the signal processing circuit 3, a drive current is supplied to the operational amplifier circuit A10 and the buffer circuits A11 and A12 from a current source 8. The current source 8 is controlled by the timing generator 5 and activates the signal processing circuit 3 by supplying the drive current to the signal processing circuit 3. Further, the current source 8 may inactivate the signal processing circuit 3 by shutting off or limiting the current supplied to the signal processing circuit 3. For example, the signal processing circuit 3 may be inactivated when the control signal RES(1) applied to the gate of the reset transistor M2 changes. Furthermore, the signal processing circuit 3 may be inactivated before the signal processing circuit 3 starts a sample and hold operation.

The operational amplifier circuit A10 is formed of a differential amplifier circuit or the like, and a reference voltage VREF is applied to the non-inverting input node. The inverting input node of the operational amplifier circuit A10 is connected to the isolation switch 11 via the input capacitor C0 and the input node N1. The inverting input node and the non-inverting input node of the operational amplifier circuit A10 are virtually short-circuited, and the voltage in the inverting input node is also the reference voltage VREF. The feedback capacitor C1 is connected between the inverting input node and the output node of the operational amplifier circuit A10, and the switch SW1 is connected to both electrodes of the feedback capacitor C1. A control signal PSW1 is input to the gate of the switch SW1, and turning on/off of the switch SW1 is controlled by the control signal PSW1. The switch SW1 controls an electrical connection of a feedback path between the inverting input node and the output node. When the switch SW1 is turned off, the operational amplifier circuit A10 inverts and amplifies the signal of the input node N1 at a gain determined by a ratio (C0/C1) between a capacitance value of the input capacitor C0 and a capacitance value of the feedback capacitor C1. When the switch SW1 is turned on, the operational amplifier circuit A10 operates as a voltage follower.

The output node of the operational amplifier circuit 10 is connected to the holding capacitors CTS1 and CTN1 via the switches SW2 and SW3, respectively. The switch SW2 is controlled by a control signal PCTS1, and the switch SW3 is controlled by a control signal PCTN1. When the switch SW2 is turned on, a pixel signal (hereinafter, referred to as "pixel signal S") at the time of photoelectric conversion is output to the holding capacitor CTS1. The holding capacitor CTS1 holds (samples and holds) the pixel signal S even after the switch SW2 is turned off. Similarly, when the switch SW3 is turned on, a pixel signal (hereinafter, referred to as "pixel signal N") at the time of reset is output to the holding capacitor CTN1, and the holding capacitor CTN1 holds the pixel signal N even after the switch SW3 is turned off.

The buffer circuits A11 and A12 are formed of a source follower circuit or the like. The input node of the buffer circuit A11 is connected to the holding capacitor CTS1, and the input node of the buffer circuit A12 is connected to the holding capacitor CTN1. The output node of the buffer circuit A11 is connected to the holding capacitor CTS2 via the switch SW4, and the output node of the buffer circuit A12 is connected to the holding capacitor CTN2 via the switch SW5. The switches SW4 and SW5 are controlled by a control signal PCT2, and in response to the control signal PCT2 being controlled to the high level, the output nodes of the buffer circuits A11 and A12 are electrically connected to the holding capacitors CTS2 and CTN2. That is, the pixel signal S is transferred from the holding capacitor CTS1 to the holding capacitor CTS2, and the pixel signal N is transferred from the holding capacitor CTN1 to the holding capacitor CTN2. The holding capacitor CTS2 is connected to an output node N21 of the signal processing circuit 3 via the switch SW6, and the holding capacitor CTN2 is connected to an output node N22 of the signal processing circuit 3 via the switch SW7. The switches SW6 and SW7 are controlled by a control signal PH1, and when the switch SW6 and the switch SW7 are turned on, the pixel signal S and the pixel signal N held in the holding capacitors CTS2 and CTN2 are output to the output nodes N21 and N22, respectively. The output nodes N21 and N22 are output from the solid state imaging device 100 via different horizontal output lines SOUT.

The horizontal scanning circuit 4 is formed of a shift register, a gate circuit, or the like and sequentially scans a plurality of signal processing circuits 3. That is, the horizontal scanning circuit 4 reads out pixel signals from the signal processing circuit 3 by sequentially controlling the control signals PH1 and PH2 on each column to the high level. The differential amplifier circuit provided outside or inside the solid state imaging device 100 outputs a signal corresponding to a difference between the pixel signal S and the pixel signal N output from the signal processing circuit 3, and a signal in which the pixel signal N that is a noise component has been removed from the pixel signal S by correlated double sampling (CDS) can be obtained.

The timing generator 5 generates the control signals PVLON, PSW1, PCTS1, PCTN1, and PCT2 based on the clock synchronization signal or the like and also controls the operation of the vertical scanning circuit 2 and the horizontal scanning circuit 4. The timing generator 5 may include a constant voltage circuit that generates the reference voltage VREF.

Figure 2:
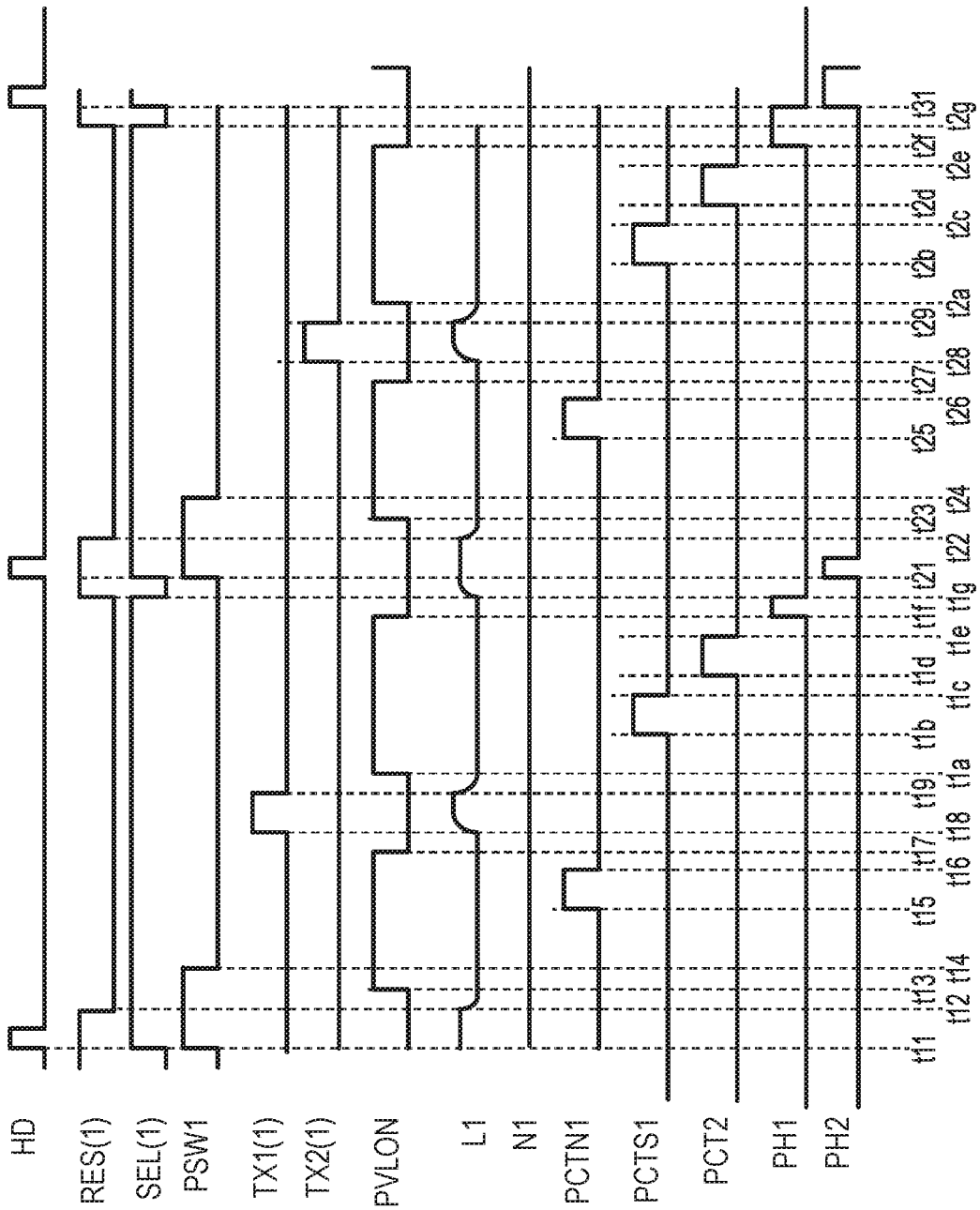
FIG. 2 is a timing chart illustrating a drive method of the solid state imaging device in the first embodiment of the present invention.

FIG. 2 is a timing chart illustrating a drive method of the solid state imaging device in the present embodiment. At time t11, the horizontal synchronization signal HD is controlled to the high level, and the first horizontal scanning period starts. The vertical scanning circuit 2 causes the control signal SEL(1) to transition from the low level to the high level and turns on the select transistor M4 in the pixels 10 on the first row. That is, the pixels 10 on the first row are selected as a readout row. The timing generator 5 maintains the control signals PVLON, PCTN1, PCTS1, and PCT2 at the low level. The vertical scanning circuit 2 controls a control signal RES(1) to the high level and turns on the reset transistor M2 in the pixels 10 on the first row, and thereby the power source voltage is applied to the floating diffusion region FD. Note that, while the control signal RES(1) applied to the gate of the reset transistor M2 changes, the signal processing circuit 3 may be inactivated by shutting off or limiting the drive current for the signal processing circuit 3.

At time t12, the control signal RES transitions from the high level to the low level, and the reset transistor M2 is turned off. The reset of the floating diffusion region FD is completed, and the voltage of the column signal line L1 changes to a reset level. At this time, the control signal PVLON is at the low level, and the isolation switch 11 is in an off-state. Since the column signal line L1 is electrically disconnected from the input node N1 of the signal processing circuit 3, the input node N1 is not affected by the voltage change of the column signal line L1.

At the time t11, the control signal PSW1 is controlled to the high level, and the switch SW1 of the signal processing circuit 3 is turned on. In the operational amplifier circuit A10, the non-inverting node and the output node are short-circuited, and the voltage of the input node N1 is clamped by the input capacitor C0. That is, the difference between the voltage of the input node N1 and the voltage of the non-inverting input terminal of the operational amplifier circuit A10 at the time of reset is held at both ends of the input capacitor C0.

At time t13, the control signal PVLON is controlled to the high level, and the isolation switch 11 is turned on. The column signal line L1 is electrically connected to the input node N1, and the pixel signal N at the time of reset is input to the input node N1 of the signal processing circuit 3.

At time t14, the control signal PSW1 is controlled to the low level, and the switch SW1 is turned off. The pixel signal N of the operational amplifier circuit A10 at the time of reset is output from the output node of the operational amplifier circuit A10. In the period from time t15 to t16, the control signal PCTN1 is controlled to the high level, the switch SW3 is turned on, and thereby the pixel signal N in the output node of the operational amplifier circuit A10 is held (sampled and held) in the holding capacitor CTN1.

At time t17, the control signal PVLON is controlled to the low level, and the isolation switch 11 is turned off. The column signal line L1 is electrically disconnected from the input node N1 of the signal processing circuit 3.

At time t18, the control signal TX1(1) transitions from the low level to the high level, and the transfer transistor M11 is turned on. Here, there are parasitic capacitances between the gate and the source and between the gate and the drain of the transfer transistor M11. When the gate voltage transitions from the low level to the high level, the voltage of the floating diffusion region FD increases due to the parasitic capacitance of the transfer transistor M11, and the voltage of the column signal line L1 also increases. At this time, since the isolation switch 11 is turned off, the voltage at the input node N1 does not change. The isolation switch 11 is maintained in an off-state throughout the period in which the transfer transistor M11 is in the on-state. In the period from time t18 to t19, charges accumulated in the photoelectric conversion unit PD1 are transferred to the floating diffusion region FD, and the pixel signal S in accordance with the charges is output from the amplification transistor M3 to the column signal line L1 via the select transistor M4.

At time t19, the control signal TX1(1) transitions from the high level to the low level, and the transfer transistor M11 is turned off. The voltage of the floating diffusion region FD decreases due to the parasitic capacitance of the transfer transistor M11, and the voltage of the column signal line L1 also decreases. In a period (time t17 to t1a) including a period (time t18 to t19) in which the transfer transistor M11 is in an on-state, the isolation switch 11 is in an off-state. Therefore, the input node N1 is not affected by the voltage change due to transition of turning on or off of the transfer transistor M11.

Note that FIG. 2 illustrates the voltage changes at dark time, and no charge is accumulated in the photoelectric conversion unit PD1. Therefore, before and after the period of the time t18 to t19, that is, in each of the periods before the transfer transistor M11 is turned on and after the transfer transistor M11 is turned off, the voltage of the column signal line L1 does not change. On and after the time t19, the voltage of the column signal line L1 returns to the voltage occurring before the time t17. Note that, when the photoelectric conversion unit PD1 accumulates charges in accordance with an incident light, the voltage change in accordance with the charges may occur in the column signal line L1.

At time t1a, the control signal PVLON is controlled to the high level, the isolation switch 11 is turned on, and thereby the column signal line L1 is electrically connected to the input node N1. When no charge is accumulated in the photoelectric conversion unit PD1, the voltage of the column signal line L1 is constant at the time t16 when the isolation switch 11 is turned off and the time t1a when the isolation switch 11 is turned on, respectively. That is, regardless of transition of turning on or off of the transfer transistor M11, the voltage of the column signal line L1 does not change.

In the period from time t1b to t1c, the control signal PCTS1 is controlled to the high level, the switch SW2 is turned on, and thereby the pixel signal S in the output node of the operational amplifier circuit A10 is held in the holding capacitor CTS1. Here, since the pixel signal S is based on charges at dark time, the voltage of the pixel signal S held in the holding capacitor CTS1 is equal to the voltage of the pixel signal N held in the holding capacitor CTN1.

In the period from time t1d to t1e, the control signal PCT2 is controlled to the high level, and the switches SW4 and SW5 are turned on. The pixel signal S output from the output node of the buffer circuit A11 is held in the holding capacitor CTS2 via the switch SW4, and the pixel signal N output from an output node of the buffer circuit A12 is held in the holding capacitor CTN2 via the switch SW5.

On and after time t1e, the control signal PCT2 is controlled to the low level, the switches SW4 and SW5 are turned off, and thereby the holding capacitors CTS2 and CTN2 are electrically disconnected from the buffer circuits A11 and A12. Therefore, as described below, it is possible to perform readout by the horizontal scanning circuit 4 and driving of the pixels at the same time.

In the period from time t1f to t21, the horizontal scanning circuit 4 reads out a signal of the signal processing circuit 3 sequentially on a column basis. That is, the control signal PH1 is controlled from the low level to the high level, and the switches SW6 and SW7 on the first column are turned on. The pixel signal S held in the holding capacitor CTS2 is output from the output node N21 via the switch SW6, and the pixel signal N held in the holding capacitor CTN2 is output from the output node N22 via the switch SW7. Subsequently, the control signal PH2 is controlled from the low level to the high level, the switches SW6 and SW7 on the second column are turned on, and the pixel signal N and the pixel signal S are read out.

At time t1*f*, the control signal PVLON is controlled to the low level, and the isolation switch 11 is turned off. The column signal line L1 is electrically disconnected from the input node N1 of the signal processing circuit 3.

At the time t1*g*, the control signal SEL(1) transitions from the high level to the low level, the select transistor M4 is turned off, and thereby the selection of the pixels 10 on the first row is cancelled. The control signal RES(1) transitions from the low level to the high level, and the reset transistor M2 is turned on. The voltage of the floating diffusion region FD increases due to the parasitic capacitance of the reset transistor M2, and similarly the voltage of the column signal line L1 also increases. At time t22, the control signal RES transitions from the high level to the low level, and the reset transistor M2 is turned off. Thereby, the reset of the floating diffusion region FD is completed. Further, the voltage of the column signal line L1 decreases due to the parasitic capacitance of the reset transistor M2. Here, in the period from the time t1*f* to t23, the control signal PVLON is at the low level. That is, in a period (time t1*f* to t23) including a period (time t1*g* to t22) in which the reset transistor M2 is in an on-state, the isolation switch 11 is maintained in an off-state, and the column signal line L1 is electrically disconnected from the input node N1 of the signal processing circuit 3. Therefore, the input node N1 of the signal processing circuit 3 is not affected by the voltage change of the column signal line L1 due to the transition of the reset transistor M2.

At time t21, the horizontal synchronization signal HD is controlled from the low level to the high level, and the second horizontal scanning period starts. At the same time, in response to the control signal SEL(1) being controlled from the low level to the high level, the select transistor M4 on the first row is turned on, and the pixels 10 on the first row are again selected.

In the period from the time t21 to t24, the control signal PSW1 is controlled to the high level, and the switch SW1 of the signal processing circuit 3 is turned on. In the operational amplifier circuit A10, the non-inverting node and the output node are short-circuited. At the time t24, the control signal PSW1 is controlled to the low level, the switch SW1 is turned off, and the voltage of the operational amplifier circuit A10 at the time of reset is output from the output node of the operational amplifier circuit A10.

At the time t23, the control signal PVLON is controlled to the high level, and the isolation switch 11 is turned on. The column signal line L1 is electrically connected to the input node N1, and the pixel signal N at the time of reset is input to the signal processing circuit 3. The voltage of the column signal line L1 at this time is equal to the voltage at the time t1*f* when the isolation switch 11 is turned off. In addition, the voltage of the input node N1 of the signal processing circuit 3 does not change, and the settling time of the voltage in the input node N1 is not required. It is therefore possible to reduce the time to time t26 when the signal is sampled and held in the holding capacitor CTN1.

In the period from time t25 to t26, the control signal PCTN1 is controlled to the high level, the switch SW3 is turned on, and thereby the signal N in the output node of the operational amplifier circuit A10 is held in the holding capacitor CTN1. At time t27, the control signal PVLON is controlled to the low level, and the isolation switch 11 is turned off. The column signal line L1 is electrically disconnected from the input node N1 of the signal processing circuit 3.

At time t28, the control signal TX2(1) transitions from the low level to the high level, and the transfer transistor M12 is turned on. At time t29, the control signal TX2(1) transitions from the high level to the low level, and the transfer transistor M12 is turned off. The voltage of the floating diffusion region FD changes due to the parasitic capacitance of the transfer transistor M12, and the voltage of the column signal line L1 also changes. At this time, since the isolation switch 11 is in the off-state, the input node N1 of the signal processing circuit 3 is not affected by the voltage change of the column signal line L1.

At time t2*a*, the control signal PVLON is controlled to the high level, and the isolation switch 11 is turned on. The column signal line L1 is electrically connected to the input node N1. When no charge is accumulated in the photoelectric conversion unit PD1, the voltage of the column signal line L1 is constant at the time t16 when the isolation switch 11 is turned off and the time t1*a* when the isolation switch 11 is turned on, respectively.

In the period from time t2*b* to t2*c*, the control signal PCTS1 is controlled to the high level, the switch SW2 is turned on, and thereby the pixel signal S in the output node of the operational amplifier circuit A10 is held in the holding capacitor CTS1. In the period from time t2*d* to t2*e*, the control signal PCT2 is controlled to the high level, and the switches SW4 and SW5 are turned on. The pixel signal S output from the output node of the buffer circuit A11 is held in the holding capacitor CTS2 via the switch SW4, and the pixel signal N output from the buffer circuit A12 is held in the holding capacitor CTN2 via the switch SW5.

On and after the time t2*e*, the control signal PCT2 is controlled to the low level, the switches SW4 and SW5 are turned off, and thereby the holding capacitors CTS2 and CTN2 are electrically disconnected from the buffer circuits A11 and A12. At time t2*f* and time t31, the horizontal scanning circuit 4 reads out a signal of the signal processing circuit 3 sequentially on a column basis. That is, at the time t2*f*, the control signal PH1 is controlled from the low level to the high level, and the switches SW6 and SW7 on the first column are turned on. The pixel signal S held in the holding capacitor CTS2 is output from the output node N21 via the switch SW6, and the pixel signal N held in the holding capacitor CTN2 is output from the output node N22 via the switch SW7. At the time t31, the control signal PH2 is controlled from the low level to the high level, the switches SW6 and SW7 on the second column are turned on, and the pixel signal N and the pixel signal S are read out.

At time t2*f*, the control signal PVLON is controlled to the low level, and the isolation switch 11 is turned off. The column signal line L1 is electrically disconnected from the input node N1 of the signal processing circuit 3. At time t2*g*, the control signal SEL(1) is controlled to the low level, the transistor M4 is turned off, and thereby the selection of the pixels 10 on the first row is cancelled.

Figure 3:
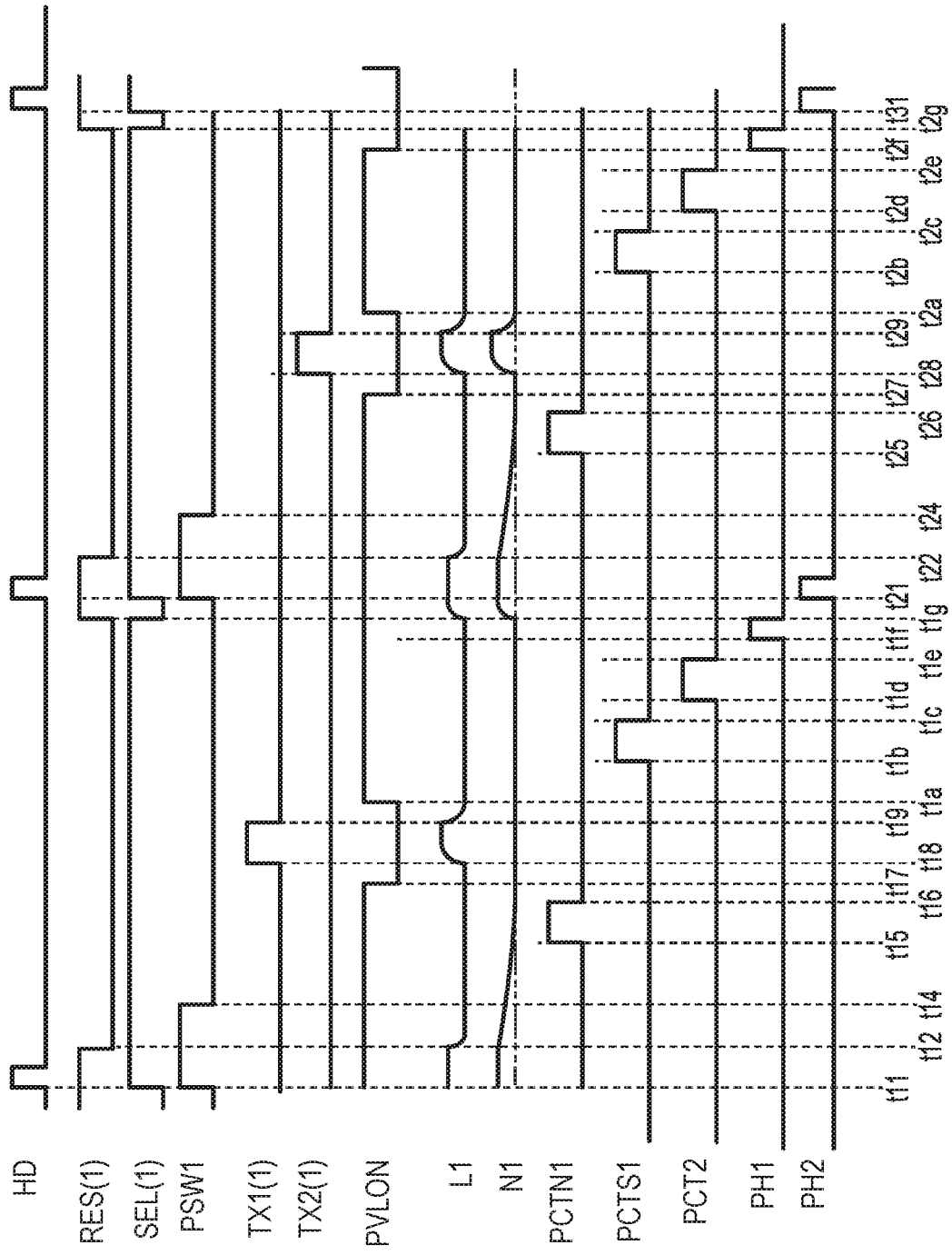
FIG. 3 is a timing chart illustrating a drive method as a comparative example.

FIG. 3 is a timing chart as a comparative example. At a timing when the reset transistor M2 and the select transistor M4 transition to an on-state or an off-state, the isolation switch 11 is in an on-state. The features different from that of FIG. 2 will be mainly described below.

At the time t1*g* and t22, the control signal RES transitions to the high level or the low level, and the voltage of the column signal line L1 changes. At this time, since the control signal PVLON is at the high level and the isolation switch 11 is in the on-state, the input node N1 of the signal processing circuit 3 is affected by the voltage change of the column signal line L1. The settling time of the voltage of the input node N1 may be different for each signal processing circuit 3 due to influence of the time constant with an ON resistance, a wiring resistance, a contact resistance, or the like of the isolation switch 11. Therefore, in the signal processing circuit 3 having the longest settling time, time to sufficiently settle the voltage of the input node N1 is required. When the solid state imaging device 100 has the signal processing circuits 3 with 4000 columns or more, for example, time to settle the voltages of the input nodes N1 on all the columns is required. If readout were performed in the signal processing circuit 3 before the voltage of the input node N1 on 1 of 4000 columns is settled, vertical line noise occurs in the corresponding column of an image, and image quality is deteriorated.

In contrast, according to the present embodiment illustrated in FIG. 2, the input node N1 of the signal processing circuit 3 is electrically disconnected from the column signal line L1 at the time t1g when the reset transistor M2 transitions to an on-state or the time t22 when the reset transistor M2 transitions to an off-state, respectively. Further, at the time t11 when the select transistor M4 transitions to an on-state or the time t1g when the select transistor M4 transitions to an off-state, the isolation switch 11 is in an off-state, respectively. Furthermore, the isolation switch 11 is in an off-state even at the time t18 and t28 when the transfer transistors M11 and M12 transition to an on-state or the time t19 and t29 when the transfer transistors M11 and M12 transition to an off-state. In such a way, at transition of the pixel transistors such as the reset transistor M2, the transfer transistors M11 and M12, the select transistor M4, or the like, the input node N1 of the signal processing circuit 3 is electrically disconnected from the column signal line L1. That is, while the isolation switch 11 is in an off-state, the signal value of the control signal applied to the gate of the pixel transistor changes. Since the voltage at the input node N1 is not affected by transition of pixel transistors, the time to the readout timing (time t16, t26, or the like) in the signal processing circuit 3 can be shortened. In recent years, as the size of the pixel is reduced, there is a demand for increasing the readout rate. According to the present embodiment, by increasing the readout rate, it is also possible to realize finer pixels.

While FIG. 2 and FIG. 3 illustrate the voltages of the column signal line L1 and the input node N1 in the absence of an incident light to the pixels 10, the same advantage is obtained even when there is an incident light to the pixels 10. When there is an incident light to the pixels 10, at the time (time t18) when the control signal TX1(1) changes from the low level to the high level after a reset operation, the voltage of the column signal line L1 may decrease. In such a state, however, there is influence of light shot noise or the like, and a slight difference of settling time required at dark time usually does not cause a problem. Therefore, even when there is an incident light to the pixels 10, it is possible to shorten the time before readout in the signal processing circuit 3.

Note that Japanese Patent Application Laid-Open No. 2008-67107 discloses a drive timing of an isolation switch in a state where an operational amplifier circuit on each column performs an amplification operation. In contrast, in the present embodiment, even when the operational amplifier circuit A10 is in a reset state, that is, the control signal PSW1 is at the high level, the isolation switch 11 is driven to an off-state. Regardless of the operation state of the operational amplifier circuit A10, by turning off the isolation switch 11 when the voltage change of the column signal line L1 may occur, it is possible to realize an increase in the readout rate. Further, the signal processing circuit 3 is not necessarily required to have the operational amplifier circuit A10, and a signal in the input node N1 may be held directly in the holding capacitors CTS1 or CTN1. Even in such a configuration, it is also possible to obtain the advantage described above in the present embodiment.

Second Embodiment

Next, a solid state imaging device and a drive method thereof in the present embodiment will be described. While the photoelectric conversion units PD1 and PD2 of the pixel 10 are allocated on two rows in the first embodiment, the photoelectric conversion units PD1 and PD2 in the present embodiment are allocated on a single row. For example, a common micro-lens is provided to the photoelectric conversion units PD1 and PD2, and a light collected by the micro-lens enters the photoelectric conversion units PD1 and PD2. As described above, two photoelectric conversion units PD1 and PD2 may be pupil-divided. Since other features are the same as those illustrated in FIG. 1, the description thereof will be omitted.

Figure 4:
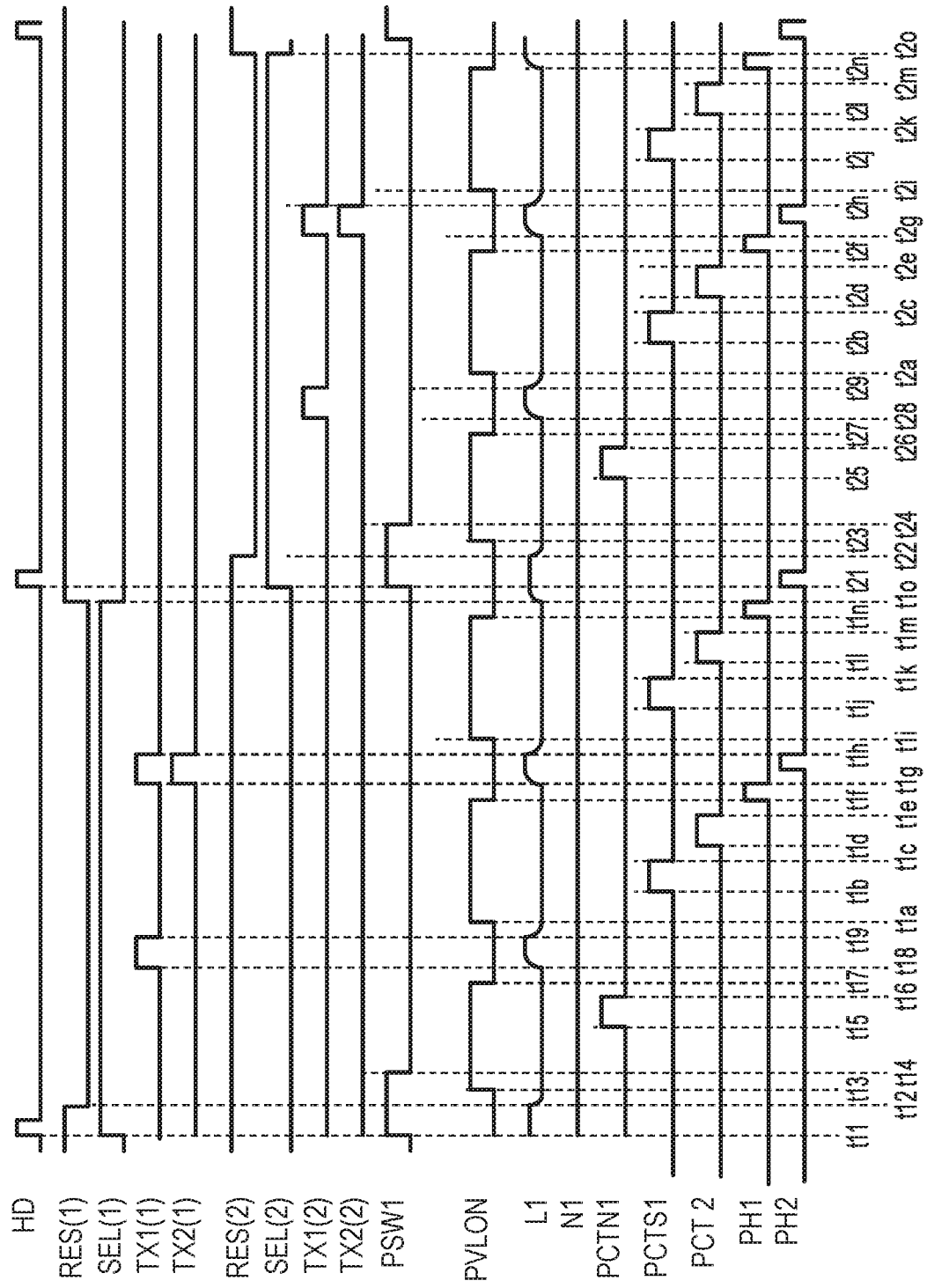
FIG. 4 is a timing chart illustrating a drive method of a solid state imaging device in a second embodiment of the present invention.

FIG. 4 is a timing chart representing the drive method of the solid state imaging device in the present embodiment. In FIG. 4, since the operations on and after the time t11 to t1e are substantially the same as the operations illustrated in FIG. 2, operations from the time t1f will be mainly described. In the period from the time t18 to t19, however, it is assumed that only the control signal TX1(1) is at the high level, and only charges in the photoelectric conversion unit PD1 have been transferred to the floating diffusion region FD.

At time t11, the horizontal synchronization signal HD is controlled to the high level, and the first horizontal scanning period starts. The control signal SEL(1) is controlled to the high level, the pixels 10 on the first row are selected as a readout row. At this time, since the isolation switch 11 is in an off-state, the input node N1 is not affected by the voltage change of the column signal line L1. The control signal RES(1) is maintained at the high level, and the reset in the pixels 10 on the first row is performed. In the period from the time t11 to t14, the control signal PSW1 is controlled to the high level, and the reset in the operational amplifier circuit A10 is performed.

At time t12, the control signal RES transitions from the high level to the low level, and the reset transistor M2 is turned off. Thereby, the reset of the floating diffusion region FD is completed, and the voltage of the column signal line L1 changes to a reset level. At this time, since the isolation switch 11 is in an off-state, the input node N1 is not affected by the voltage change of the column signal line L1.

In the period from the time t13 to t17, the control signal PVLON is at the high level, and the isolation switch 11 is turned on. The column signal line L1 is electrically connected to the input node N1, and the pixel signal N at the time of reset is input to the signal processing circuit 3.

In the period from time t15 to t16, the control signal PCTN1 is controlled to the high level, and the switch SW3 is turned on. The pixel signal N in the output node of the operational amplifier circuit A10 is held in the holding capacitor CTN1.

At time t18, the control signal TX1(1) transitions from the low level to the high level, and the transfer transistor M11 is turned on. At this time, the voltage of the floating diffusion region FD increases due to the parasitic capacitance of the transfer transistor M11, and the voltage of the column signal line L1 also increases. In the period from time t18 to t19, charges accumulated in the photoelectric conversion unit PD1 are transferred to the floating diffusion region FD, and the voltage in accordance with the charges is output from the amplification transistor M3 to the column signal line L1 via the select transistor M4.

At the time t19, the control signal TX1(1) transitions from the high level to the low level, and the transfer transistor M11 is turned off. The potential of the floating diffusion region FD decreases due to the parasitic capacitance of the transfer transistor M11, and the voltage of the column signal line L1 also decreases. In the period from the time t17 to t1a, since the control signal PVLON is at the low level, the isolation switch 11 is in an off-state, and thereby the column signal line L1 is electrically disconnected from the input node N1 of the signal processing circuit 3. Thus, the input node N1 is not affected by the voltage change of the column signal line L1 due to the transition of the transfer transistor M11 from an on-state to an off-state.

At the time t1a, the control signal PVLON is controlled to the high level, and the isolation switch 11 is turned on. In the period from time t1b to t1c, the control signal PCTS1 is controlled to the high level, and the pixel signal S in the output node of the operational amplifier circuit A10 is held in the holding capacitor CTS1. In the period from the time t1d to t1e, the control signal PCT2 is controlled to the high level, the pixel signal S is transferred to the holding capacitor CTS2, and the pixel signal N is held in the holding capacitor CTN2. On and after the time t1e, the control signal PCT2 is at the low level, and readout by the horizontal scanning circuit 4 and driving of the pixels are simultaneously performed.

At the time t1g, both the control signals TX1(1) and TX2(1) transition from the low level to the high level. The transfer transistors M11 and M12 are turned on, and charges accumulated in the photoelectric conversion units PD1 and PD2 are both transferred to the floating diffusion region FD and added together. The voltage in accordance with the charges is output from the amplification transistor M3 to the column signal line L1 via the select transistor M4. At this time, in the same manner as the time t18 in the first embodiment, the voltage of the floating diffusion region FD increases due to the parasitic capacitances of the transfer transistors M11 and M12, and the voltage of the column signal line L1 also increases. At time t1h, when the control signals TX1(1) and TX2(1) transition from the high level to the low level, the transfer transistors M11 and M12 are both turned off. The voltage of the floating diffusion region FD decreases due to the parasitic capacitances of the transfer transistors M11 and M12, and the voltage of the column signal line L1 also decreases. At the time t1g and t1h, since the isolation switch 11 is in the off-state, the input node N1 is not affected by the voltage change of the column signal line L1. Note that FIG. 4 illustrates the voltage change at dark time, and no charge is accumulated in the photoelectric conversion units PD1 and PD2. Therefore, the voltage of the column signal line L1 does not change before and after the period from the time t1g to t1h. That is, after the time t1h, the voltage of the column signal line L1 returns to the voltage occurring before the time t1g.

At time t1i, the control signal PVLON is controlled to the high level, and the isolation switch 11 is turned on. The column signal line L1 is electrically connected to the input node N1. When no charge is accumulated in the photoelectric conversion units PD1 and PD2, the voltage of the column signal line L1 is the same at the time t1f when the isolation switch 11 is turned off and the time t1i when the isolation switch 11 is turned on. Therefore, in the period from the time t1f to t1i, the voltage of the input node N1 of the signal processing circuit 3 does not change.

In the period from the time t1f to t1h, the horizontal scanning circuit 4 reads out a signal of the signal processing circuit 3 sequentially on a column basis. That is, the control signal PH1 is controlled from the low level to the high level, and the switches SW6 and SW7 on the first column are turned on. The pixel signal S held in the holding capacitor CTS2 is output from the output node N21 via the switch SW6, and the pixel signal N held in the holding capacitor CTN2 is output from the output node N22 via the switch SW7. Subsequently, the control signal PH2 is controlled from the low level to the high level, the switches SW6 and SW7 on the second column are turned on, and the pixel signal N and the pixel signal S are read. Here, the pixel signal S is a signal based on charges of the photoelectric conversion unit PD1.

In the period from time t1j to t1k, the control signal PCTS1 is controlled to the high level, the switch SW2 is turned on, and thereby the pixel signal S in the output node of the operational amplifier circuit A10 is held in the holding capacitor CTS1. Here, the pixel signal S is a signal based on the addition of charges of the photoelectric conversion units PD1 and PD2.

In the period from time t1l to t1m, the control signal PCT2 is controlled to the high level, and the switches SW4 and SW5 are turned on. The pixel signal S output from the output node of the buffer circuit A11 is held in the holding capacitor CTS2 via the switch SW4, and the pixel signal N output from the buffer circuit A12 is held in the holding capacitor CTN2 via the switch SW5.

In the period from time t1n to t21, the horizontal scanning circuit 4 reads out a signal of the signal processing circuit 3 sequentially on a column basis. That is, the control signal PH1 is controlled from the low level to the high level, and the switches SW6 and SW7 on the first column are turned on. The pixel signal S held in the holding capacitor CTS2 is output from the output node N21 via the switch SW6, and the signal N held in the holding capacitor CTN2 is output from the output node N22 via the switch SW7. Subsequently, the control signal PH2 is controlled from the low level to the high level, the switches SW6 and SW7 on the second column are turned on, and the pixel signal N and the pixel signal S are read out. Here, the pixel signal S is a signal based on the addition of charges of the photoelectric conversion units PD1 and PD2.

At time t1o, the control signal SEL(1) transitions from the high level to the low level, the select transistor M4 is turned off, and thereby the selection of the pixels 10 on the first row is cancelled. The control signal RES(1) transitions from the low level to the high level, and the reset transistor M2 is turned on. The voltage of the floating diffusion region FD increases due to the parasitic capacitance of the reset transistor M2, and similarly the voltage of the column signal line L1 also increases. Note that, since the isolation switch 11 is turned off, the voltage of the input node N1 does not change.

At the time t21, the horizontal synchronization signal HD is controlled to the high level, and the second horizontal scanning period starts. At the same time, the control signal SEL(2) transitions from the low level to the high level, and the pixels 10 on the second row are selected. At the time t22, the control signal RES(2) transitions from the high level to the low level, and the reset transistor M2 on the second row is turned off. The voltage of the floating diffusion region FD decreases due to the parasitic capacitance of the reset transistor M2, and the voltage of the column signal line L1 also decreases. Note that, since the isolation switch 11 is turned off, the voltage of the input node N1 does not change.

At the time t21, the control signal PSW1 is controlled to the high level, and the reset operation in the operational amplifier circuit A10 is performed. At the time t23, the control signal PVLON is controlled to the high level, and the isolation switch 11 is turned on. The column signal line L1 is electrically connected to the input node N1, and the pixel signal N at the time of reset is input to the signal processing circuit 3. At the time t24, the control signal PSW1 transitions to the low level, the switch SW1 is turned off, and the pixel signal N at the time of reset is output from the output node of the operational amplifier circuit A10. Since the operations from the time t25 are the same as the operations from the time t15, the description thereof will be omitted.

In the drive method described above, in a readout period for one row, that is, one horizontal scanning period from transition of the horizontal synchronization signal HD to the high level to the next transition to the high level, readout of the pixel signal N at the time of reset, readout of the pixel signal S of the photoelectric conversion unit PD1, and readout of the pixel signal S of the photoelectric conversion units PD1 and PD2 are performed. Therefore, the transfer transistors M11 and M12 are required to transition to the high level and the low level for multiple times in one horizontal scanning period, settling time of the voltage in the column signal line L1 increases, and thereby it may be difficult to perform multiple times of readout in one horizontal scanning period. Here, when the signal processing circuit 3 samples and holds a signal from the input node N1 before the voltage has been settled, the image quality is reduced as described above. According to the present embodiment, by turning off the isolation switch 11 in a period in which the voltage of the column signal line L1 may change, the settling time of the voltage in the input node N1 can be shortened. By including a plurality of periods in which the isolation switch 11 is in an off-state in one horizontal scanning period, it is possible to perform multiple times of readout at a high rate in one horizontal scanning period without deteriorating image quality.

Third Embodiment

Figure 5:
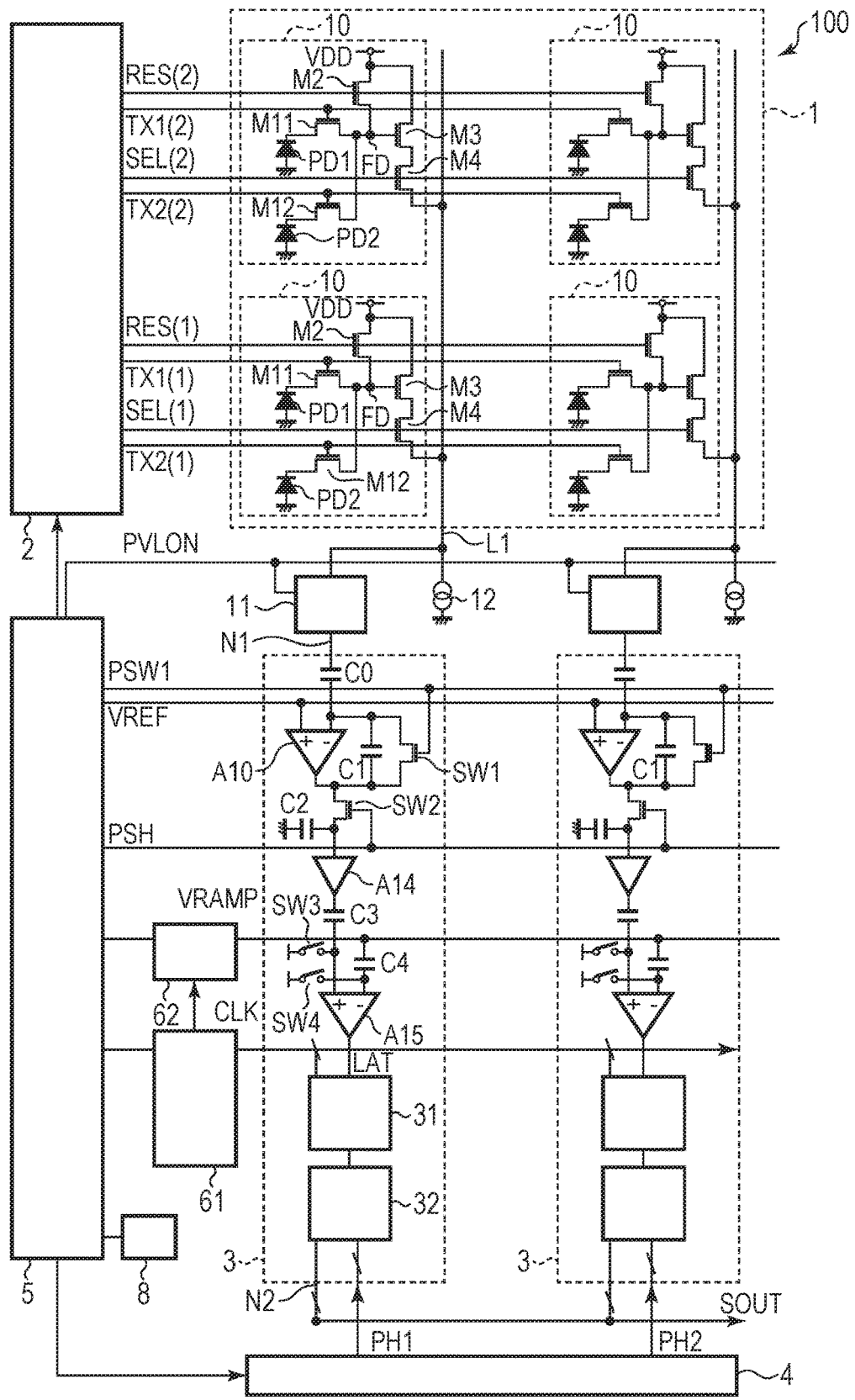
FIG. 5 is a block diagram of a solid state imaging device in a third embodiment of the present invention.
Figure 6:
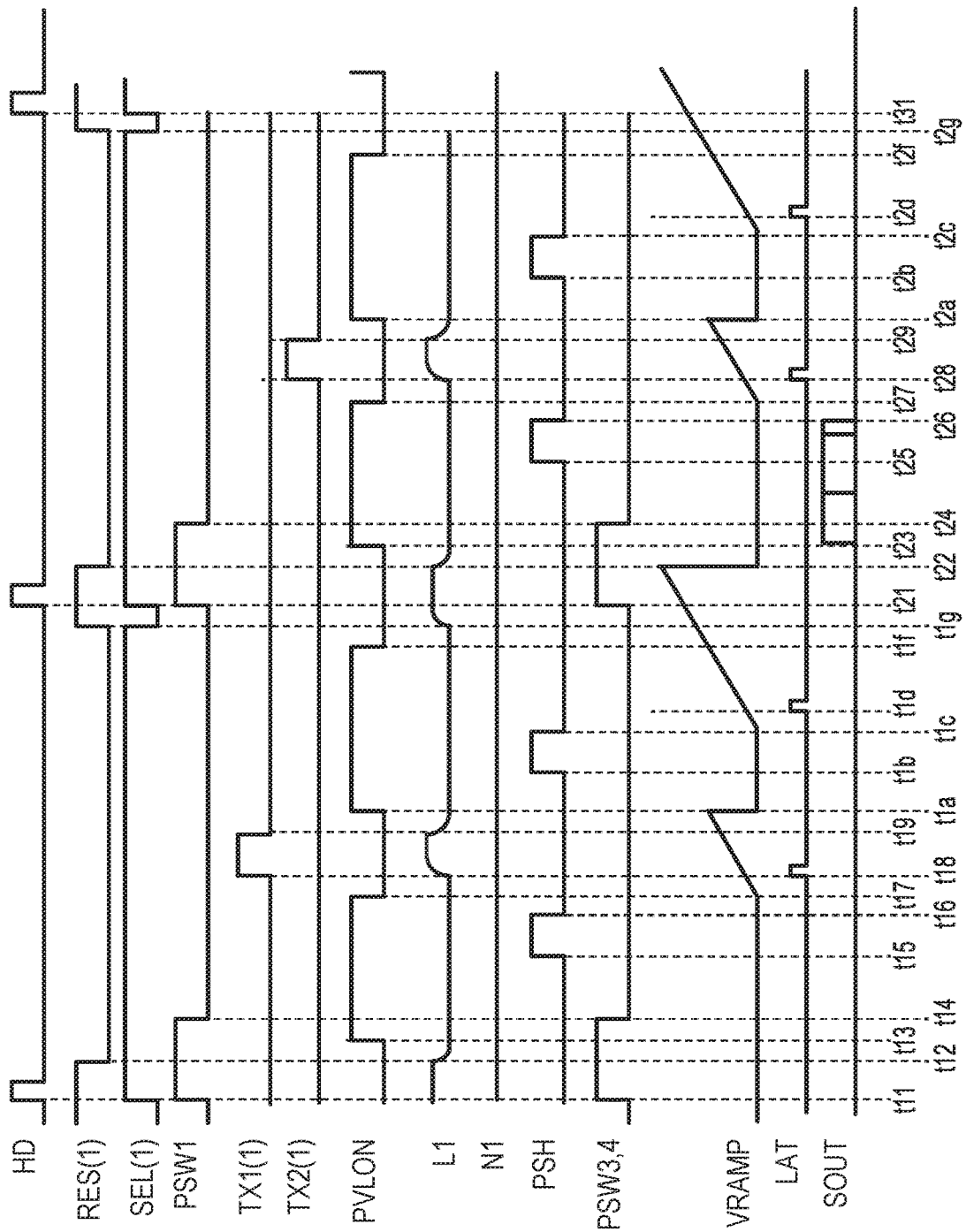
FIG. 6 is a timing chart illustrating a drive method of the solid state imaging device in the third embodiment of the present invention.

With respect to a solid state imaging device and a drive method thereof in the present embodiment, in the embodiment described by using FIG. 5 and FIG. 6, a signal processing circuit has an analog-to-digital conversion circuit. Features different from the first embodiment will be mainly described below. Features or signals identical or corresponding to those of the first embodiment are labeled with the same reference.

FIG. 5 is a block diagram of a solid state imaging device in the present embodiment. The solid state imaging device 100 has the pixel array 1, the vertical scanning circuit 2, the signal processing circuits 3, the horizontal scanning circuit 4, the timing generator 5, the isolation switches 11, the constant current sources 12, a clock generation circuit 61, and a ramp signal generation circuit 62.

The clock generation circuit 61 generates a clock signal CLK having a constant cycle based on a trigger signal from the timing generator 5. The ramp signal generation circuit 62 generates a ramp signal VRAMP based on the clock signal CLK and a trigger signal from the timing generator 5. The ramp signal VRAMP is a signal whose voltage value changes (increases or decreases) with time and used as a reference signal for analog-to-digital conversion.

The signal processing circuit 3 is provided on each column of the pixels 10 and configured to read out pixel signals from the pixels 10 via the column signal line L1 and perform analog-to-digital conversion. The signal processing circuit 3 includes the operational amplifier circuit A10, a buffer circuit A14, a comparator circuit A15, the switches SW1 to SW4, the input capacitor C0, the feedback capacitor C1, and capacitors C2, C3, and C4, a counter circuit 31, and a memory 32. A drive current is supplied from the current source 8 to the operational amplifier circuit A10, the buffer circuit A14, the comparator circuit A15, the counter circuit 31, and the memory 32. The current source 8 is controlled by the timing generator 5 and activates the signal processing circuit 3 by supplying the drive current to the signal processing circuit 3. Further, the current source 8 may inactivate the signal processing circuit 3 by shutting off or limiting the current supplied to the signal processing circuit 3.

The operational amplifier circuit A10, the switch SW1, the input capacitor C0, and the feedback capacitor C1 are configured in the same manner as the first embodiment. An output node of the operational amplifier circuit A10 is connected to the capacitor C2 via the switch SW2. A control signal PSH from the timing generator 5 is input to the gate of the switch SW2, and turning on/off of the switch SW2 is controlled by the control signal PSH. The buffer circuit A14 is formed of a source follower circuit or the like, and the capacitor C2 is connected to the input node of the buffer circuit A14. A signal amplified by the operational amplifier circuit A10 is held (sampled and held) in the capacitor C2.

The comparator circuit A15 is formed of a differential amplifier circuit or the like. A pixel signal is input to the non-inverting input node via the capacitor C3, and the ramp signal VRAMP is input to the inverting input node via the capacitor C4. The reference voltage such as the power source voltage is applied to the non-inverting input node and the inverting input node by the switches SW3 and SW4. That is, in response to the switches SW3 and SW4 being turned on, the pixel signal and the ramp signal VRAMP are clamped at the reference voltage. The switches SW3 and SW4 are driven by control signals PSW3 and PSW4 (not illustrated). The comparator circuit A15 compares the pixel signal and the ramp signal VRAMP and outputs a comparison signal LAT representing the comparison result. The counter circuit 31 counts a clock signal CLK and outputs a count value when the comparison signal LAT is inverted. The memory 32 holds the count value output from the counter circuit 31 and outputs the count value in accordance with the control signals PH1 and PH2 from the horizontal scanning circuit 4.

FIG. 6 is a timing chart illustrating a drive method of the solid state imaging device in the present embodiment. At the time t11, the horizontal synchronization signal HD is controlled to the high level, and the first horizontal scanning period starts. The control signal SEL(1) is controlled to the high level, and the pixels 10 on the first row are selected as a readout row. The control signal RES(1) is maintained at the high level, and the reset in the pixels 10 on the first row is performed. At the time t12, the control signal RES(1) transitions from the high level to the low level, the reset transistor M2 is turned off, and the voltage of the column signal line L1 changes. At this time, since the isolation switch 11 is turned off, the input node N1 is not affected by the voltage change of the column signal line L1.

At the time t11, the control signals PSW1, PSW3, and PSW4 are controlled to the high level, the switch SW1 is turned on, and thereby the non-inverting node and the output node are short-circuited in the operational amplifier circuit A10. Similarly, in response to the control signals PSW3 and PSW4 being controlled to the high level, the switches SW3 and SW4 are turned on, and thereby the reference voltage is applied to the non-inverting input node and the inverting input node in the comparator circuit A15. At the time t13, the control signal PVLON is controlled to the high level, and the isolation switch 11 is turned on. The column signal line L1 is electrically connected to the input node N1, and the pixel signal N at the time of reset is input to the input node N1.

At the time t14, the control signals PSW1, PSW3, and PSW4 are controlled to the low level. The switch SW1 is turned off, and the operational amplifier circuit A10 amplifies and outputs the pixel signal N. Further, the switches SW3 and SW4 are turned off, and the applied voltage is held in the capacitors C3 and C4.

In the period from the time t15 to t16, the control signal PSH is controlled to the high level, the switch SW2 is turned on, and thereby the pixel signal N in the output node of the operational amplifier circuit A10 is output to the capacitor C2. At the time t16, the control signal PSH is controlled to the low level, the switch SW2 is turned off, and thereby the pixel signal N is held in the capacitor C2.

At the time t17, the ramp signal generation circuit 62 starts increasing the value of the ramp signal VRAMP. The ramp signal generation circuit 62 supplies the ramp signal VRAMP to the comparator circuit A15 via the capacitor C4. The comparator circuit A15 compares the pixel signal in the non-inverting input node with the ramp signal VRAMP in the inverting input node and outputs the comparison signal LAT representing the comparison result. At the same time when the ramp signal VRAMP starts increasing, the counter circuit 31 starts counting the clock signal CLK.

At the time t18, when the relationship of the pixel signal and the ramp signal is inverted, the comparator circuit A15 changes the comparison signal LAT from the low level to the high level. When receiving a high level comparison signal LAT, the counter circuit 31 stops outputting the count value to the memory 32, and the memory 32 holds the last count value output from the counter circuit 31. Note that, when receiving the high level comparison signal LAT, the counter circuit 31 may stop counting the clock signal CLK and hold the count value. Further, when receiving the high level comparison signal LAT, the counter circuit 31 may stop the operation. In such a way, the pixel signal N at the time of reset is converted into a digital signal. The pixel signal N may include at least one of noise at the time of reset of the pixel 10, an offset voltage of the operational amplifier circuit A10, an offset voltage of the comparator circuit A15, and the like.

At the time t1a, when a predetermined time period has elapsed from the start of the increase of the ramp signal VRAMP, the ramp signal generation circuit 62 ends the increase of the ramp signal VRAMP.

At the time t18, the control signal TX1(1) transitions from the low level to the high level, the transfer transistor M11 is turned on, and thereby charges accumulated in the photoelectric conversion unit PD1 are transferred to the floating diffusion region FD. A voltage in accordance with charges is output from the amplification transistor M3 to the column signal line L1 via the select transistor M4. At the time t19, the control signal TX1(1) transitions from the high level to the low level, and the transfer transistor M11 is turned off. The potential of the floating diffusion region FD changes due to the parasitic capacitance of the transfer transistor M11, and the potential of the column signal line L1 also changes. At this time, since the isolation switch 11 is turned off, the voltage in the input node N1 does not change.

At the time t1a, the control signal PVLON is controlled to the high level, and the isolation switch 11 is turned on. The input node N1 is electrically connected to the column signal line L1, and the pixel signal S is input to the input node N1. In the period from the time t1b to t1c, the control signal PSH is controlled to the high level, and the pixel signal S in the output node of the operational amplifier circuit A10 is held in the capacitor C2.

At the time t1c, the ramp signal generation circuit 62 starts increasing a value of the ramp signal VRAMP. At the same time when the ramp signal VRAMP starts increasing, the counter circuit 31 starts counting the clock signal CLK. At the time t1d, when the relationship of the pixel signal and the ramp signal is inverted, the comparator circuit A15 changes the comparison signal LAT from the low level to the high level, and the memory 32 holds the count value. Thereby, the pixel signal S at the time of photoelectric conversion is converted into a digital signal and held in the memory 32. At the time t22, when a predetermined time period has elapsed from the start of increase of the ramp signal VRAMP, the ramp signal generation circuit 62 ends the increase of the ramp signal VRAMP.

At the time t1f, the control signal PVLON is controlled to the low level, and the isolation switch 11 is turned off. The column signal line L1 is electrically disconnected from the input node N1 of the signal processing circuit 3.

At the time t1g, the control signal RES(1) transitions from the high level to the low level, and the selection of the pixels 10 on the first row is cancelled. The control signal RES(1) transitions from the low level to the high level, and the reset transistor M2 is turned on. The voltage of the floating diffusion region FD increases due to the parasitic capacitance of the reset transistor M2, and similarly the voltage of the column signal line L1 also increases. At the time t22, the control signal RES transitions from the high level to the low level, and the reset transistor M2 is turned off. The reset of the floating diffusion region FD is thus completed, and the voltage of the column signal line L1 changes to the reset level. On the other hand, in the period from the time t1f to t23, the control signal PVLON is at the low level, the isolation switch 11 is maintained in an off-state, and the column signal line L1 is electrically disconnected from the input node N1 of the signal processing circuit 3. Therefore, the input node N1 is not affected by the voltage change of the column signal line L1 due to the transition of turning on or off of the reset transistor M2.

At the time t21, the horizontal synchronization signal HD is controlled from the low level to the high level, and the second horizontal scanning period starts. At the same time, the control signal SEL(1) transitions from the low level to the high level, the select transistor M4 on the first row is turned on, and the pixels 10 on the first row are again selected.

At the time t21, the control signals PSW1, PSW3, and PSW4 are controlled to the high level. In response to the switch SW1 being turned on, the non-inverting node and the output node are short-circuited in the operational amplifier circuit A10. Similarly, in response to the control signals PSW3 and PSW4 being controlled to the high level, the switches SW3 and SW4 are turned on, and the reference voltage is applied to the non-inverting input node and the inverting input node in the comparator circuit A15. At the time t23, the control signal PVLON is controlled to the high level, and the isolation switch 11 is turned on. The column signal line L1 is electrically connected to the input node N1, and the pixel signal N at the time of reset is input to the input node N1.

In the period from the time t23 to t26, the horizontal scanning circuit 4 scans the signal processing circuits 3 on a column basis and sequentially reads out the digitally converted pixel signal N and pixel signal S. Here, the read out pixel signal N and pixel signal S are based on a signal read out from the pixel 10 in the first horizontal scanning period.

At the time t23, the control signal PVLON is controlled to the high level, and the isolation switch 11 is turned on. The column signal line L1 is electrically connected to the input node N1, and the signal N at the time of reset is input to the signal processing circuit 3.

In the period from the time t25 to t26, the control signal PSH is controlled to the high level, the switch SW2 is turned on, and thereby the pixel signal N in the output node of the operational amplifier circuit A10 is output to the capacitor C2. At the time t26, the control signal PSH is controlled to the low level, the switch SW2 is turned off, and the pixel signal N is held in the capacitor C2.

At the time t27, the ramp signal generation circuit 62 starts increasing the value of the ramp signal VRAMP. The ramp signal generation circuit 62 supplies the ramp signal VRAMP to the comparator circuit A15 via the capacitor C4. The comparator circuit A15 compares the pixel signal in the non-inverting input node and the ramp signal VRAMP in the inverting input node and outputs the comparison signal LAT representing the comparison result. At the same time when the ramp signal VRAMP starts increasing, the counter circuit 31 starts counting the clock signal CLK.

At the time t28, when the relationship of the pixel signal and the ramp signal is inverted, the comparator circuit A15 changes the comparison signal LAT from the low level to the high level, and the counter circuit 31 holds the count value. In such a way, the pixel signal N at the time of reset is converted into a digital signal.

At the time t28, the control signal TX2(1) is controlled to the high level, the transfer transistor M12 is turned on, and thereby charges accumulated in the photoelectric conversion unit PD2 are transferred to the floating diffusion region FD. A voltage in accordance with charges is output from the amplification transistor M3 to the column signal line L1 via the select transistor M4. At the time t29, the control signal TX2(1) transitions from the high level to the low level, and the transfer transistor M12 is turned off. At this time, since the isolation switch 11 is turned off, the voltage in the input node N1 does not change.

At the time t2a, the control signal PVLON is controlled to the high level, and the isolation switch 11 is turned on. The input node N1 is electrically connected to the column signal line L1, and the pixel signal S is input to the input node N1. In the period from the time t2b to t2c, the control signal PSH is controlled to the high level, and the pixel signal S in the output node of the operational amplifier circuit A10 is held in the capacitor C2.

At the time t2c, the ramp signal generation circuit 62 starts increasing a value of the ramp signal VRAMP. At the same time when the ramp signal VRAMP starts increasing, the counter circuit 31 starts counting the clock signal CLK. At the time t2d, when the relationship of the pixel signal and the ramp signal is inverted, the comparator circuit A15 changes the comparison signal LAT from the low level to the high level, and the memory 32 holds the count value. Thereby, the pixel signal S at the time of photoelectric conversion is converted into a digital signal and held in the memory 32.

At the time t2f, the control signal PVLON is controlled from the high level to the low level, and the isolation switch 11 is turned off. The column signal line L1 is electrically disconnected from the input node N1 of the signal processing circuit 3.

At the time t2g, the control signal SEL(1) transitions from the high level to the low level, and the selection of the pixels 10 on the first row is cancelled. The control signal RES(1) transitions from the low level to the high level, and the reset transistor M2 is turned on. In the period from the time t2f to t31, the control signal PVLON is at the low level, the isolation switch 11 is maintained in the off-state, and the column signal line L1 is electrically disconnected from the input node N1 of the signal processing circuit 3. Therefore, the input node N1 of the signal processing circuit 3 is not affected by the voltage change of the column signal line L1.

On and after the time t31, the horizontal synchronization signal HD is controlled from the low level to the high level, and the third horizontal scanning period starts. In the same manner as the first horizontal scanning period, readout of the photoelectric conversion unit PD1 on the second row is then performed.

According to the present embodiment, in a period in which the voltage of the column signal line L1 may change due to transition of the pixel transistors, the isolation switch 11 is turned off, and the input node N1 is electrically disconnected from the column signal line L1. For example, while the reset transistor M2 is controlled from an on-state to an off-state at the time t12, the settling time of the voltage in the input node N1 can be shortened by turning off the isolation switch 11. Thereby, the time t16 of sampling and holding the pixel signal N in the signal processing circuit 3 can be advanced, and even in a case where multiple times of readout are performed in one horizontal scanning period, it is possible to perform readout at a high rate without deteriorating image quality.

Note that, instead of providing the counter circuit 31 for each column, a counter circuit common to each column may be provided to the clock generation circuit 61. In this case, each of the memories 32 can perform analog-to-digital conversion on a column basis by holding the common count value in accordance with the comparison signal LAT.

Further, analog-to-digital conversion of a pixel signal of the photoelectric conversion unit PD1 and analog-to-digital conversion of an added signal of the photoelectric conversion unit PD1 and PD2 may be performed in one horizontal scanning period. As described in the second embodiment, according to the present embodiment, since the settling time in the input node N1 can be shortened, it is possible to perform analog-to-digital conversion for multiple times at a high rate in one horizontal scanning period.

Fourth Embodiment

Figure 7:
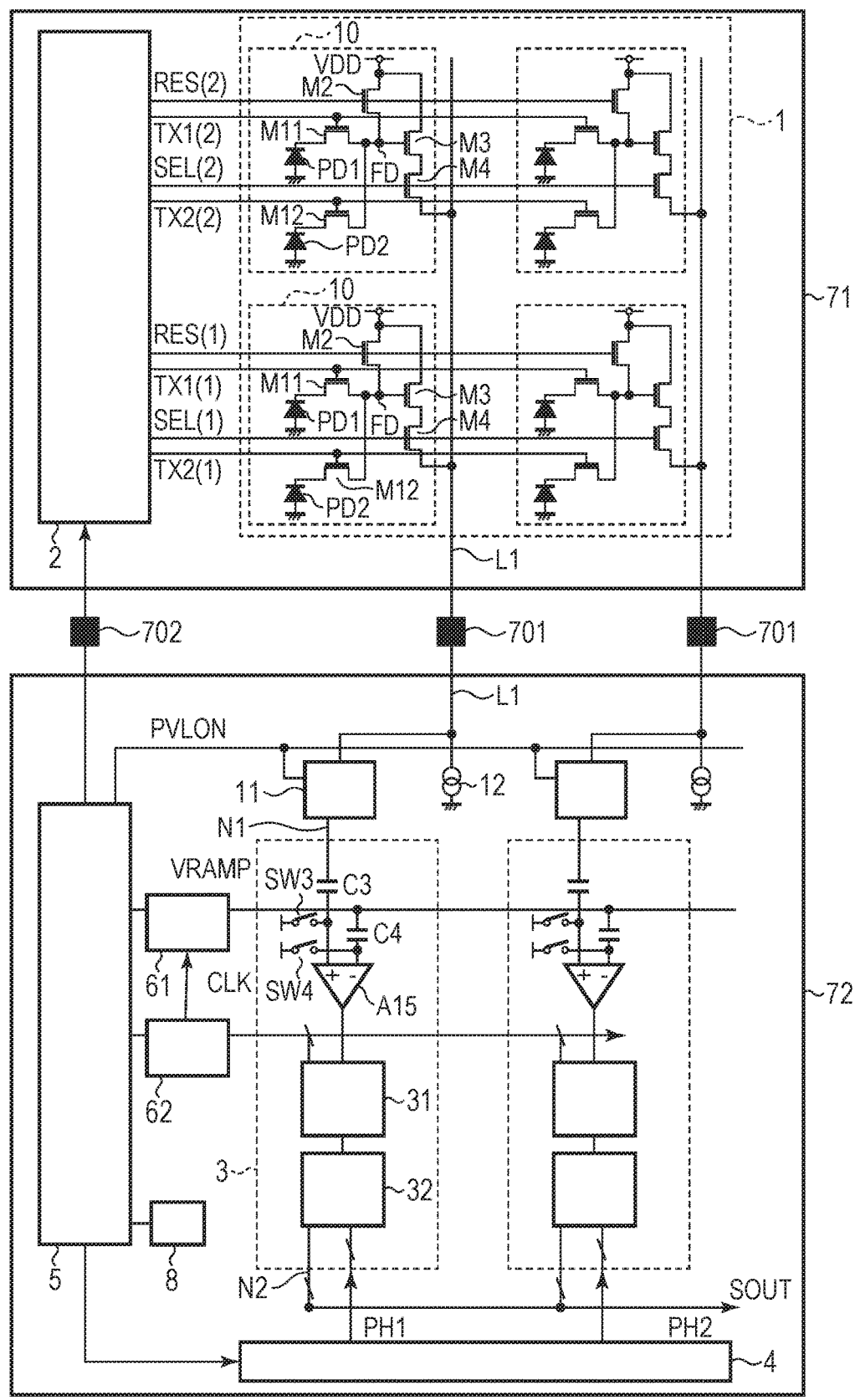
FIG. 7 is a block diagram of a solid state imaging device in a fourth embodiment of the present invention.

With respect to the solid state imaging device and the drive method thereof in the present embodiment, FIG. 7 is a block diagram of the solid state imaging device in the present embodiment. The solid state imaging device in the present embodiment is different from the solid state imaging devices in the first to third embodiments in that the solid state imaging device in the present embodiment is formed of stacked substrates. Features different from the third embodiment will be mainly described below. Features or signals identical or corresponding to those of the first to third embodiments are labeled with the same reference.

In FIG. 7, the solid state imaging device has a pixel circuit substrate (first substrate) 71 and a readout circuit substrate (second substrate) 72 each of which is a silicon substrate. The pixel circuit substrate 71 and the readout circuit substrate 72 are stacked and attached to each other. The pixel circuit substrate 71 has the pixel array 1 and the vertical scanning circuit 2, and the pixel array 1 has a plurality of pixels 10 arranged in a matrix. The readout circuit substrate 72 has the signal processing circuits 3, the horizontal scanning circuit 4, the timing generator 5, the isolation switches 11, the constant current sources 12, the ramp signal generation circuit 62, the clock generation circuit 61, and the current source 8. Connection portions 701 and 702 connect respective wirings of the pixel circuit substrate 71 and the readout circuit substrate 72 to each other. The connection portion 702 connects the vertical scanning circuit 2 and the timing generator 5 to each other, and the connection portion 701 connects the column signal line L1 on the pixel circuit substrate 71 side and the column signal line L1 on the readout circuit substrate 72 side to each other. Note that no operational amplifier circuit is provided between the input node N1 of the signal processing circuit 3 and the comparator circuit A15.

Also in the present embodiment, since the isolation switch 11 is controlled to an off-state when the voltage of the column signal line L1 may change, the voltage change of the column signal line L1 is not transmitted to the input node N1. Therefore, it is possible to shorten the voltage settling time in the input node N1 and increase the readout rate in the signal processing circuit 3. Further, in the present embodiment, the pixel circuit substrate 71 and the readout circuit substrate 72 are arranged as separate substrates, and a column signal line L1 is connected to the input node N1 via the connection portion 701. Since the connection portion 701 contains a resistance component, the settling time of the voltage may be increased due to the time constant of the connection portion 701. Therefore, in the present embodiment, it is particularly effective to electrically disconnect the column signal line L1 from the input node N1 by the isolation switch 11.

Note that, the isolation switch 11 may be arranged on the pixel circuit substrate 71. Further, respective circuit elements arranged on the pixel circuit substrate 71 and the readout circuit substrate 72 are not necessarily limited to the example of FIG. 7. For example, the constant current source 12 may be arranged on the pixel circuit substrate 71, and the vertical scanning circuit 2 may be arranged on the readout circuit substrate 72. Even in such a configuration, the advantage of the present embodiment can be similarly obtained.

Fifth Embodiment

Figure 8:
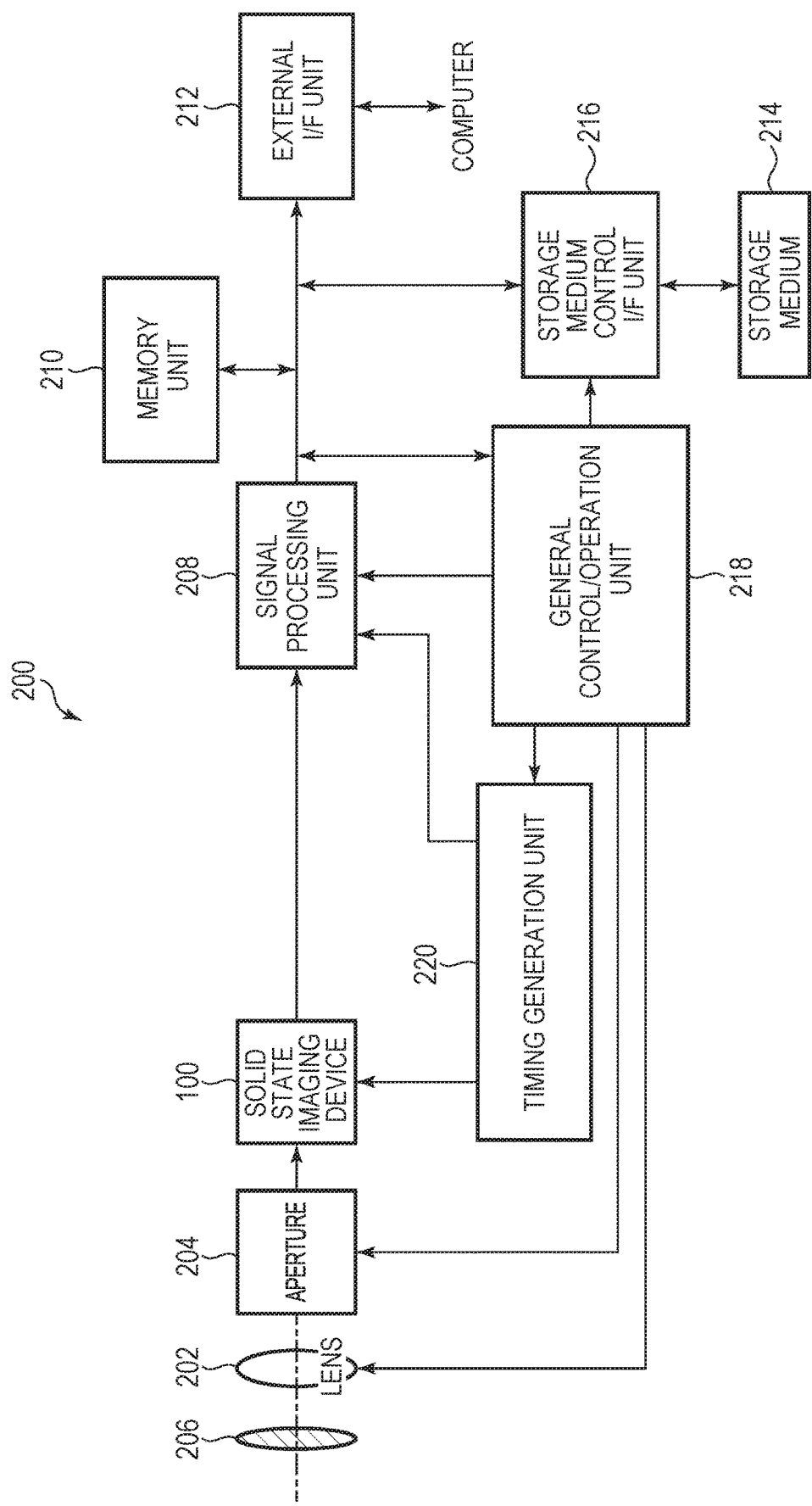
FIG. 8 is a block diagram of an imaging system in a fifth embodiment of the present invention.

The solid state imaging device in the embodiments described above can be applied to various imaging systems. The imaging systems may be a digital still camera, a digital camcorder, a camera head, a copying machine, a fax machine, a mobile phone, an on-vehicle camera, an observation satellite, a surveillance camera, or the like. FIG. 8 illustrates a block diagram of a digital still camera as an example of the imaging system.

The imaging system 200 illustrated in FIG. 8 has a barrier 206, a lens 203, an aperture 204, the solid state imaging device 100, a signal processing unit 208, a timing generating unit 220, a general control/operation unit 218, a memory unit 210, a storage medium control interface (I/F) unit 216, a storage medium 214, and an external interface (I/F) unit 212. The barrier 206 protects the lens, and the lens 203 captures an optical image of a subject onto the solid state imaging device 100. The aperture 204 can change the amount of light passing through the lens 203. The solid state imaging device 100 is formed as described in the embodiments described above and converts the optical image captured by the lens 203 to an image data. Here, an analog-to-digital (AD) conversion unit is formed on a semiconductor substrate of the solid state imaging device 100. The signal processing unit 208 performs various correction and compression of data on the imaging data output from the solid state imaging device 100.

The timing generating unit 220 outputs various timing signals to the solid state imaging device 100 and the signal processing unit 208. The general control/operation unit 218 controls the entire digital still camera, and the memory unit 210 temporary stores the image data. The storage medium control I/F unit 216 is an interface used for storage or readout of the image data in the storage medium 214, and the storage medium 214 is a removable storage medium such as a semiconductor memory used for storage or readout of the imaging data. The external I/F unit 212 is an interface used for communicating with an external computer or the like. A timing signal or the like may be input from the outside of the imaging system, and the imaging system may have at least the solid state imaging device 100 and the signal processing unit 208 that processes an imaging signal output from the solid state imaging device 100.

In the present embodiment, while the solid state imaging device 100 and the AD conversion unit are provided on separated substrates, the solid state imaging device 100 and the AD conversion unit may be formed on the same semiconductor substrate. Further, the solid state imaging device 100 and the signal processing unit 208 may be formed on the same semiconductor substrate.

Further, each pixel may have a first photoelectric conversion unit and a second photoelectric conversion unit. The signal processing unit 208 may be configured to process a pixel signal based on charges generated in the first photoelectric conversion unit and a pixel signal based on charges generated in the second photoelectric conversion unit to acquire distance information on a distance from the solid state imaging device 100 to the subject.

Sixth Embodiment

Figure 9A:
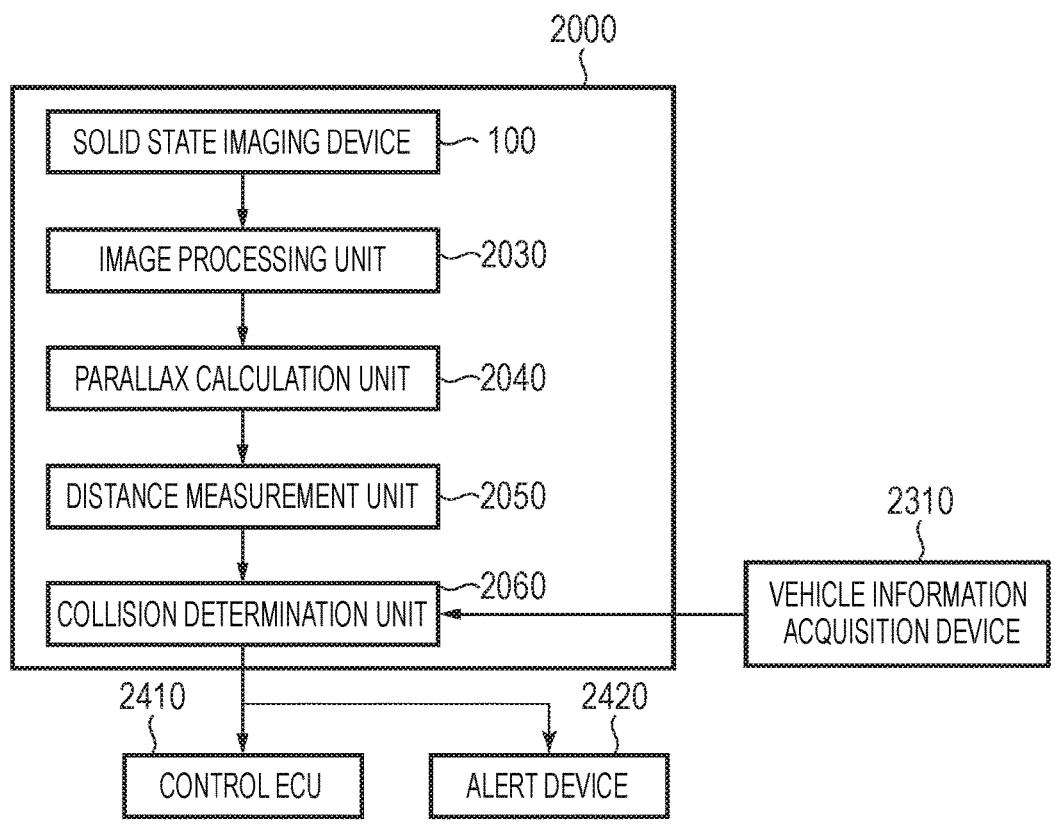
FIG. 9A and FIG. 9B are block diagrams of an imaging system in a sixth embodiment of the present invention.
Figure 9B:
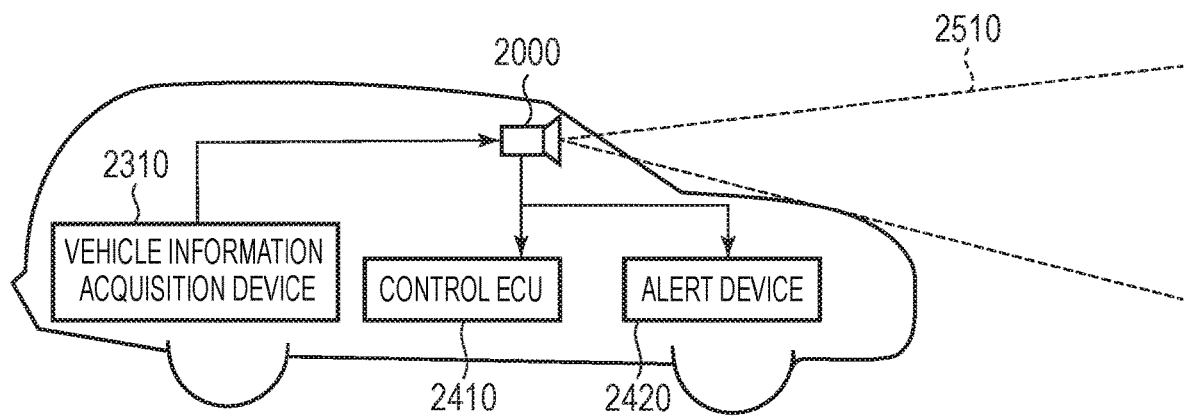

FIG. 9A and FIG. 9B are block diagrams of an imaging system with respect to an on-vehicle camera in the present embodiment. The imaging system 2000 has the solid state imaging device 100 of the embodiments described above. The imaging system 2000 has an image processing unit 2030 that performs image processing on a plurality of image data acquired by the solid state imaging device 100 and a parallax calculation unit 2040 that calculates a parallax (a phase difference of parallax images) from the plurality of image data acquired by the imaging system 2000. Further, the imaging system 2000 has a distance measurement unit 2050 that calculates a distance to the object based on the calculated parallax and a collision determination unit 2060 that determines whether or not there is a collision possibility based on the calculated distance. Here, the parallax calculation unit 2040 and the distance measurement unit 2050 are an example of a distance information acquisition unit that acquires distance information on the distance to the object. That is, the distance information is information on a parallax, a defocus amount, a distance to an object, or the like. The collision determination unit 2060 may use any of the distance information to determine the collision possibility. The distance information acquisition unit may be implemented by dedicatedly designed hardware or may be implemented by a software module. Further, the distance information acquisition unit may be implemented by a Field Programmable Gate Array (FPGA) or an Application Specific Integrated Circuit (ASIC) or may be implemented by combination thereof.

The imaging system 2000 is connected to a vehicle information acquisition device 2310 and can acquire vehicle information such as a vehicle speed, a yaw rate, a steering angle, or the like. Further, the imaging system 2000 is connected to a control ECU 2410, which is a control device that outputs a control signal for causing a vehicle to generate braking force based on a determination result by the collision determination unit 2060. Further, the imaging system 2000 is also connected to an alert device 2420 that issues an alert to the driver based on a determination result by the collision determination unit 2060. For example, when the collision probability is high as the determination result of the collision determination unit 2060, the control ECU 2410 performs vehicle control to avoid a collision or reduce damage by applying a brake, pushing back an accelerator, suppressing engine power, or the like. The alert device 2420 alerts a user by sounding an alert such as a sound, displaying alert information on a display of a car navigation system or the like, providing vibration to a seat belt or a steering wheel, or the like. The imaging system 2000 functions as a control unit that performs control of the operation to control a vehicle as described above.

In the present embodiment, an area around a vehicle, for example, a front area or a rear area is captured by using the imaging system 2000. FIG. 9B illustrates the imaging system when a front area of a vehicle (a capturing area 2510) is captured. The vehicle information acquisition device 2310 as an imaging control unit transmits an instruction to the imaging system 2000 or the solid state imaging device 100 so as to perform the operation described in the above first to fifth embodiments. Such a configuration can further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a moving unit (moving apparatus) such as a ship, an airplane, or an industrial robot, for example. In addition, the imaging system can be widely applied to a device which utilizes object recognition, such as an intelligent transportation system (ITS), without being limited to moving units.

OTHER EMBODIMENTS

The present invention is not limited to the embodiments described above, and various modifications are possible. For example, an example in which a part of the configuration of any of the embodiments is added to another embodiment or an example in which a part of the configuration of any of the embodiments is replaced with a part of the configuration of another embodiment is one of the embodiments of the present invention.

While each of the transistors forming the pixels is an N-channel MOS in the embodiments described above, the pixel may be formed by using a P-channel MOS. Further, the photoelectric conversion unit is not limited to a unit that excites negative charges and may be a unit that generates holes. When each of the reset transistor, the transfer transistor, and the select transistor is a P-channel MOS, the high level and the low level of the control signals supplied to the gates are opposite to those in the embodiments described above. In such a case, the use of a photoelectric conversion unit that generates holes can improve a charge transfer efficiency. Further, the number of photoelectric conversion units sharing the amplification transistor is not limited to the number in the embodiments described above, and the amplification transistor can be shared by any number of photoelectric conversion units. Further, a photoelectric conversion unit may be formed on the back surface of a substrate, and a plurality of photoelectric conversion units may be stacked and formed as with an organic photoelectric conversion film.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-168745, filed Sep. 10, 2018, which is hereby incorporated by reference wherein in its entirety.

What is claimed is:

1. A solid state imaging device comprising:
   at least one pixel having at least one photoelectric conversion unit that generates charges, an amplification transistor including an input node that receives a signal based on the charges generated in the photoelectric conversion unit, and a reset transistor that resets a potential of the input node of the amplification transistor;
   at least one signal processing circuit that reads out a signal from the pixel via a signal line; and
   a switch provided between the signal line and an input node of the signal processing circuit,
   wherein a signal value of a control signal applied to a gate of the reset transistor changes while the switch is in an off-state,
   wherein the switch is in the off-state in a period including at least a part of a period in which the reset transistor is in an on-state, and wherein the signal value of the control signal applied to the gate of the reset transistor changes while the signal processing circuit is in an inactive state and the switch is in the off-state.

2. The solid state imaging device according to claim 1, wherein the amplification transistor outputs a signal based on the charges generated in the photoelectric conversion unit to the signal line, and after the switch has transitioned from an on-state to an off-state, the reset transistor transitions from an off-state to an on-state, and wherein after the reset transistor has transitioned from an on-state to an off-state, the switch transitions from the off-state to the on-state, and the amplification transistor outputs, to the signal line, a signal occurring in a state where the input node has been reset.

3. The solid state imaging device according to claim 1 comprising a select transistor provided between the amplification transistor and the signal line and configured to electrically connect or disconnect the amplification transistor to or from the signal line, wherein a signal value of a control signal applied to a gate of the select transistor changes while the switch is in the off-state.

4. The solid state imaging device according to claim 1 comprising:
a floating diffusion region forming the input node; and
a transfer transistor that transfers the charges to the floating diffusion region,
wherein a signal value of a control signal applied to a gate of the transfer transistor changes while the switch is in the off-state.

5. The solid state imaging device according to claim 1 comprising:
a floating diffusion region forming the input node; and
a transfer transistor that transfers the charges to the floating diffusion region,
wherein the switch is maintained in the off-state over an entire period in which the transfer transistor is in an on-state.

6. The solid state imaging device according to claim 1, wherein the pixel has a plurality of photoelectric conversion units and a plurality of transfer transistors provided in association with the plurality of photoelectric conversion units, and
wherein a signal value of a control signal applied to at least one gate of the plurality of transfer transistors changes while the switch is in the off-state.

7. The solid state imaging device according to claim 1, wherein the signal processing circuit samples and holds a signal of the input node with the switch being in the on-state.

8. The solid state imaging device according to claim 1 comprising a plurality of pixels arranged in a matrix and a plurality of signal processing circuits provided on each column, and
wherein a plurality of periods in which the switch is in an off-state are included within one horizontal scanning period in which a signal of the pixels is read out on a row basis.

9. The solid state imaging device according to claim 1 comprising:
a first substrate on which the pixel is formed; and
a second substrate that is stacked on the first substrate and on which the signal processing circuit is formed,
wherein the signal line is wired via a connection portion of the first substrate and the second substrate.

10. An imaging system comprising:
the solid state imaging device according to claim 1; and
a signal processing unit that processes pixel signals output from the solid state imaging device.

11. The imaging system according to claim 10, wherein the pixel comprises a plurality of photoelectric conversion units, and
wherein the signal processing unit processes each of the pixel signals generated in each of the plurality of photoelectric conversion units and acquires distance information on a distance from the solid state imaging device to a subject.

12. A signal processing device comprising:
a signal line that transmits a signal from a pixel including a photoelectric conversion unit that generates charges, a transistor including an input node that receives a signal based on the charges generated in the photoelectric conversion unit, and a reset transistor that resets a potential of the input node of the transistor;
a signal processing circuit that receives a signal transmitted from the signal line;
a switch provided between the signal line and an input node of the signal processing circuit; and
a control circuit that changes a signal value of a control signal applied to a gate of the reset transistor while the switch is in an off-state,
wherein the switch is in the off-state in a period including at least a part of a period in which the reset transistor is an on-state, and
wherein the signal value of the control signal applied to the gate of the reset transistor changes while the signal processing circuit is in an inactive state, and the switch is in the off-state.

13. A drive method of the solid state imaging device comprising a pixel having a photoelectric conversion unit generates charges, an amplification transistor including an input node that receives a signal based on the charges generated in the photoelectric conversion unit, and a reset transistor that resets a potential of the input node of the amplification transistor, a signal processing circuit that reads out a signal from the pixel via a signal line, and a switch provided between the signal line and an input node of the signal processing circuit, the drive method comprising steps of:
controlling the reset transistor from an off-state to an on-state after controlling the switch from an on-state to an off-state;
controlling the switch from an off-state to an on-state after controlling the reset transistor from an on-state to an off-state;
sampling and holding a signal of the input node by the signal processing circuit with the switch being in the on-state; and
changing a signal value of a control signal applied to a gate of the reset transistor while the signal processing circuit is in an inactive state and the switch is in the off-state.

* * * * *